United States Patent [19]
Hayashida

[11] Patent Number: 5,747,957
[45] Date of Patent: May 5, 1998

[54] METHOD OF CONTROLLING VECTORS IN MOTOR AND VECTOR-CONTROLLING INVERTER DEVICE

[75] Inventor: Takahiro Hayashida, Tokyo, Japan

[73] Assignee: Mitsubishi Denki Kabushiki Kaisha, Tokyo, Japan

[21] Appl. No.: 743,662

[22] Filed: Nov. 5, 1996

[30] Foreign Application Priority Data

Apr. 25, 1996 [JP] Japan ................... 8-105803

[51] Int. Cl.$^6$ ............................ H02P 5/41
[52] U.S. Cl. ................ 319/799; 318/801; 318/809; 318/811
[58] Field of Search ................ 318/727, 729, 318/767, 798, 811

[56] References Cited

U.S. PATENT DOCUMENTS

| | | | |
|---|---|---|---|
| 4,361,794 | 11/1982 | Kawada et al. | 318/800 |
| 4,780,650 | 10/1988 | Miyazaki et al. | 318/798 X |
| 5,270,498 | 12/1993 | Tanahashi | 318/801 X |

FOREIGN PATENT DOCUMENTS

| | | |
|---|---|---|
| 4-47554 | 8/1992 | Japan. |
| 4-111298 | 9/1992 | Japan. |
| 5-227779 | 9/1993 | Japan. |
| A 2237943 | 5/1991 | United Kingdom. |
| A 2280798 | 2/1995 | United Kingdom. |

*Primary Examiner*—Bentsu Ro
*Attorney, Agent, or Firm*—Sughrue, Mion, Zinn, Macpeak & Seas, PLLC

[57] ABSTRACT

In a vector control method for controlling a motor by detecting a primary current in a motor driven by an inverter circuit with an electric current detector, dividing the primary current detection value detected by the electric current detector to a current-for-torque detection value and a detected current-for-excitation detection value, and thus dividing a primary current instruction value to a current-for-torque instruction value and a current-for-excitation value, a portion between the current-for-torque detection value and current-for-excitation detection value each obtained from the primary current detection value is changed by an Iq gain circuit (gain Kqc) and an Id gain circuit (gain Kd), which are discrete circuits, and the rated torque characteristics of the motor is changed according to change of the apportion.

48 Claims, 16 Drawing Sheets

METHOD OF CONTROLLING VECTORS IN MOTOR AND VECTOR-CONTROLLING INVERTER DEVICE

FIELD OF THE INVENTION

The present invention relates to a method of controlling vectors in a motor (conductive motor) and a vector-controlling inverter device.

BACKGROUND OF THE INVENTION

FIG. 15 shows a conventional type of vector-controlling inverter device for driving and controlling a conductive motor. This vector-controlling inverter device comprises a rectifier 2 comprising a diode or the like for getting a DC voltage from a three-phase AD power source 1, a DC voltage smoothing filter 3, an inverter circuit 4 comprising a switching element such as a transistor and controlling a current given to a conductive motor 5 (described motor hereinafter) which is a load, a speed instructing circuit 8 for giving a speed reference (instruction value) to the motor 5, a vector controlling/computing circuit 9 for receiving an instruction value ωr* from the speed instructing circuit 8, a speed detection value ωr detected by a speed detector 6 connected to the motor 5 and current detection values Iu, Iv, Iw for each phase detected by a current detector 7 and computing primary voltage instruction values Vu*, Vv*, Vw* for each phase given to the motor 5, and a pulse width modulating/controlling circuit 10 (called PWM circuit) for generating a signal for turning ON or OFF a switching element in the inverter circuit 4 according to the primary voltage instruction values Vu*, Vv*, Vw*.

FIG. 16 shows internal configuration of the vector controlling/computing circuit 9 in the conventional type of vector-controlling inverter device. The vector controlling/computing circuit 9 comprises a speed computing amplifier 11 for amplifying deviation between the instruction value ωr* from the speed instructing circuit 8 and a detection value ωr detected by the speed detector 6 and outputting a current-for-torque instruction value Iq*, a three-phase to two-phase converter 12 for converting AD three-phase detection values Iu, Iv, Iw detected by the current detector 7 to a DC two-phase current values Iq (current detection value for torque) and Id (current detection value for excitation), a primary delay computer 13 for estimating and computing a secondary magnetic flux detection value $\Phi_2$ for the motor 5 from the current detection value for excitation Id, a secondary magnetic flux instruction generator 14 for generating a secondary magnetic flux instruction value $\Phi_2$* according to a detection value ωr detected by the speed detector 6, a magnetic flux computing amplifier 15 for amplifying deviation between the second magnetic flux instruction value $\Phi_2$* and the secondary magnetic flux detection value $\Phi_2$ and outputting a current-for-excitation instruction value Id*, a subtractor 16, an current-for-torque amplifier 17a for amplifying deviation between the current-for-torque instruction value Iq* and outputting a voltage-for-torque instruction value Vq*, a current-for-excitation amplifier 17b for amplifying deviation between the current-for-excitation instruction value Id* and a current-for-excitation detection value Id and outputting a voltage-for-excitation instruction value Vd*, a divider 18 for dividing the current-for-torque instruction value Iq* by the secondary magnetic flux detection value $\Phi_2$ and computing a slip instruction ωs*, an adder 19 for adding the slip instruction ωs* to the speed detection value ωr and computing a primary angular frequency instruction value ω0* to a motor, an integrator 20 for integrating the primary angular frequency instruction ω0* and computing a torque argument θ0, and a two-phase to three-phase converter 21 for converting the DC voltage-for-torque instruction value Vq* and the DC voltage-for-excitation instruction value Vd* to AD three-phase primary voltage instruction value Vu*, Vv*, Vw*.

It should be noted that all values for three phases are not always necessary and by detecting values for any two phases, a current value for a remaining one phase may be obtained from a relation of Iu+Iv+Iw=0.

With the configuration as described above, next description is made for a current-for-torque Iq and a current-for-excitation excitation Id controlled in the vector controlling computing circuit 9 with reference to FIG. 17 and FIG. 18.

FIG. 17 shows a T-shaped equivalent circuit which is a common equivalent circuit for an induction motor, and this equivalent circuit comprises a primary resistance $r_1$, a primary leak inductance $l_1$, a mutual inductance lm, a secondary leak inductance $l_2$, and a secondary resistance $r_2/s$. Herein the sign of $r_2/s$ is used because the secondary resistance changes according to slip s of the motor.

A current flowing through the mutual inductance lm is a current-for-excitation Id, and a current flowing through the secondary leak inductance $l_2$ as well as through the secondary resistance $r_2/s$ is the current-for-torque Iq. These two currents are perpendicular to each other, and a current synthesized from the two currents is a primary current $I_1$ for the motor. A product of the current-for-torque Iq with the current-for-excitation Id is proportionate to the torque. The vector control is for instantly controlling the current-for-torque Iq and current-for-excitation Id to optimal values respectively.

FIG. 18 shows a relation among the primary current $I_1$, current-for-torque Iq, and current-for-excitation Id in a motor with a d-q coordinate system. The axis q and axis d are perpendicular to each other, namely the axis q is advanced by $\pi/2$ from the axis d, and vector sum of the current-for-torque Iq and current-for-excitation Id is a primary current $I_1$ for the motor.

For instance, assuming that a current for torque is $Iq^{100}$ and a current-for-excitation is $Id^{100}$ when a rated torque for the motor is generated, in a case where $Iq^{100}$ is 4A and $Id^{100}$ is 3A, a primary rated current $I_1^{100}$ or the motor is expressed by the following excitation:

$$I_1^{100} = \sqrt{(4A^2 + 3A^2)} = \sqrt{(25A)} = 5A \ .$$

In the vector-controlling inverter device as described above, for the purpose to directly control a current, the current must be an ideal sinusoidal wave to insure the control precision and the performance. To satisfy the requirement, in the vector-controlling inverter device, for the purpose to suppress current distortion due to saturation of a terminal voltage in a motor, a motor to be controlled is limited to a motor dedicated for vector control with a low terminal vector, and the vector-controlling inverter device is not applied to use of a general-purpose motor for V/F control.

FIG. 19 shows an example of motor terminal voltage characteristics shown by comparing the motor voltage characteristics in a dedicated motor for vector control and that in a general-purpose motor for V/F control. In FIG. 19, the solid line section shown by the sign Vv indicates the motor terminal voltage characteristics in a dedicated motor for vector control, while the dotted line section shown by the sign Vv/f indicates the motor terminal voltage characteristics in a general-purpose motor for V/F control.

In a general-purpose motor for V/F control, the motor terminal voltage is designed to a level higher as compared to that in a dedicated motor for vector control. The reason is that there is no need for current control and it is not necessary to take into considerations effect by saturation of the motor terminal voltage, and that a capacity of an inverter can be reduced with also the cost of inverter reduced by making relatively smaller a current for generating the constant torque by means of setting the voltage to a high level.

In contrast, in a general-purpose motor for vector control, the motor terminal voltage is designed to the voltage saturated level or less (for instance, 160 V or less) even at the maximum torque so that the motor terminal voltage will not be saturated.

For this reason, in applications in which it is desirable to use a vector-controlling inverter device having a control performance substantially better than that in a V/F-controlling inverter device, for the purpose of cost reduction, even in a general-purpose motor with a speed detector cheaper than that in a dedicated motor for vector control (general-purpose motors are produced in mass and the price is cheaper than that of dedicated motors produced in a small lot) is put under vector control, at a speed higher than that at which voltage saturation is generated, a rated torque which is identical to that during V/F control can not be generated. FIG. 19 shows the example and the rated torque becomes lower at a rotational speed of 1200 rpm or more.

SUMMARY OF THE INVENTION

It is an object of the present invention to provide a method of controlling vectors in a motor and a vector-controlling inverter device which can generate a rated torque identical to that during V/F control with high precision and in a stable condition in the entire speed range even when running a general-purpose motor under vector control.

In the method of controlling vectors in a motor according to the invention, a current detection value is apportioned in a specified ratio between a current detection value for torque and current-for-excitation detection value obtained from a detected primary current value, whereby the current-for-torque and current-for-excitation detection value are apportioned in a specified ratio, and the rated torque characteristics of the motor is changed.

In the method of controlling vectors in a motor according to the invention, apportion of a current detection value between a current detection value for torque and current-for-excitation detection value obtained from a primary current detection value is changed according to an external input signal, whereby rated torque characteristics of the motor is switched to discrete adapted characteristics according to the external input signal.

In the method of controlling vectors in a motor according to the invention, an external input signal discriminates a short time torque mode in which desired characteristics is obtained for a short time rated torque from a continuous torque mode in which desired characteristics for a continuous rated torque is obtained and apportion between a current detection value for torque and current-for-excitation detection value obtained from a primary current detection value is switched between the short time torque mode and continuous torque mode according to the external input signal.

In the method of controlling vectors in a motor according to the invention, apportion of a current detection value between a current detection value for torque and current-for-excitation detection value obtained from a primary current detection value is changed according to a converter voltage detection value, whereby the rated torque characteristics of the motor is switched to adapted characteristics according to the converter voltage detection value.

In the method of controlling vectors in a motor according to the invention, a continuous torque mode in which desired characteristics for a continuous rated torque is obtained is automatically selected in a case where a converter voltage is low, a short time torque mode in which desired characteristics for a short time rated torque is obtained is automatically selected in a case where the converter voltage is high, and apportion between a current detection value for torque and current-for-excitation detection value obtained from a primary current detection value is switched between the short time torque mode and continuous torque mode.

In the method of controlling vectors in a motor according to the invention, apportion between a current detection value for torque and current-for-excitation detection value obtained from a primary current detection value is changed according to whether a motor is in powering or in regeneration, whereby the rated torque characteristics for the motor is switched to discrete adapted characteristics according to whether the motor is in powering or in regeneration.

In the method of controlling vectors in a motor according to the invention, determination is made without requiring any particular sensor as to whether a mode is in a powering mode or in a regeneration mode according to whether a product of multiplication between a speed detection value for the motor and a current detection value for torque is positive or negative.

In the method of controlling vectors in a motor according to the invention, a continuous torque mode in which desired characteristics for a continuous rated torque is obtained is automatically selected in a case of powering mode, a short time torque mode in which desired characteristics for a short time rated torque is obtained is automatically selected in a case of regeneration mode, and apportion between a current detection value for torque and current-for-excitation detection value obtained from a primary current detection value is switched between the short time torque mode and continuous torque mode.

In the method of controlling vectors in a motor according to the invention, apportion between a current detection value for torque and current-for-excitation detection value obtained from a primary current detection value is changed according to whether a motor accelerates or decelerates an inverter or not, whereby the rated torque characteristics of the motor is switched to discrete adapted characteristics according to whether the inverter is accelerated or decelerated or not.

In the method of controlling vectors in a motor according to the invention, determination is made without requiring any particular sensor as to whether an inverter is accelerated or decelerated or not according to whether an absolute value of deviation between an speed instruction value and a speed detection value is not less than a specified value or not.

In the method of controlling vectors in a motor according to the invention, a continuous torque mode in which desired characteristics for a continuous rated torque is obtained is automatically selected in a case where an inverter is not accelerated nor decelerated, a short time torque mode in which desired characteristics for a short time rated torque is obtained is automatically selected in a case where the inverter is accelerated or decelerated, and apportion between a current detection value for torque and current-forexcitation detection value obtained from a primary current detection value is switched between the short time torque mode and continuous torque mode.

In the method of controlling vectors in a motor according to the invention, apportion between a current detection value for torque and current-for-excitation detection value is changed by discretely setting a gain for the current detection value for torque and current-for-excitation detection value.

In the method of controlling vectors in a motor according to the invention, a PWM frequency for a pulse width modulating circuit for controlling a inverter is switched according to switching of the rated torque characteristics of a motor by means of changing apportion between a current detection value for torque and current-for-excitation detection value obtained from a primary current detection value.

In the method of controlling vectors in a motor according to the invention, a PWM frequency is set to a frequency lower than that in the ordinary mode in the short time torque mode and to a frequency in the ordinary mode in the continuous torque mode.

In the vector-controlling inverter device in a motor according to the invention, a current detection value between a current detection value for torque and current-for-excitation detection value obtained from a primary current detection value is apportioned in a specified ratio, whereby the current-for-torque and current-for-excitation detection value are apportioned in a specified ratio, and with this feature the rated torque characteristics of the motor is changed.

In the vector-controlling inverter device in a motor according to the invention, apportion of a current detection value between a current detection value for torque and current-for-excitation detection value obtained from a primary current detection value is changed according to an external input signal, whereby the rated torque characteristics of the motor is switched to discrete adapted characteristics according to the external input signal.

In the vector-controlling inverter device in a motor according to the invention, an external input signal discriminates a short time torque mode in which desired characteristics for a short time rated torque is obtained from a continuous torque mode in which desired characteristics for a continuous rated torque is obtained and apportion between a current detection value for torque and current-for-excitation detection value obtained from a primary current detection value is switched between the short time torque mode and continuous torque mode according to the external input signal.

In the vector-controlling inverter device in a motor according to the invention, determination is made by the converter voltage comparator as to whether a converter voltage is not less than a specified value or not, and apportion between a current detection value for torque and current-for-excitation detection value obtained from a primary current detection value is changed according to an output signal from the converter voltage comparator and rated torque characteristics for the motor is switched to adapted characteristics according to a converter voltage detection value.

In the vector-controlling inverter device in a motor according to the invention, according to a result of comparison with a converter voltage comparator, a continuous torque mode in which desired characteristics for continuous rated torque is obtained is automatically selected in a case where a converter voltage is low, a short time torque mode in which desired characteristics for short time rated torque is obtained is automatically selected in a case where the converter voltage is high, and apportion between a current detection value for torque and current-for-excitation detection value obtained from a primary current detection value is switched between the short time torque mode and continuous torque mode.

In the vector-controlling inverter device in a motor according to the invention, determination is made by the powering/regeneration determining circuit as to whether a motor is in powering or in regeneration, apportion between a current detection value for torque and current-for-excitation detection value obtained from a primary current detection value is changed according to a result of determination by the powering/regeneration determining circuit, and the rated torque characteristics for the motor is switched to discrete adapted characteristics according to whether the motor is in powering or in regeneration.

In the vector-controlling inverter device in a motor according to the invention, a powering/regeneration determining circuit determines whether a mode is in a powering mode or in a regeneration mode according to whether a product of multiplication between a speed detection value for the motor and a current detection value for torque is positive or negative without requiring any particular sensor.

In the vector-controlling inverter device in a motor according to the invention, a continuous torque mode in which desired characteristics for a continuous rated torque is obtained is automatically selected in a case of the powering mode, a short time torque mode in which desired characteristics for a short time rated torque is obtained is automatically selected in a case of regeneration mode, and apportion between a current detection value for torque and current-for-excitation detection value obtained from a primary current detection value is switched between the short time torque mode and continuous torque mode.

In the vector-controlling inverter device in a motor according to the invention, determination is made by the acceleration/deceleration determining circuit as to whether an inverter is in acceleration/deceleration or not, apportion between a current detection value for torque and current-for-excitation detection value obtained from a primary current detection value is changed according to a result of determination by the acceleration/deceleration determining circuit and rated torque characteristics for the motor is switched to discrete adapted characteristics according to whether the inverter is in acceleration/deceleration or not.

In the vector-controlling inverter device in a motor according to the invention, an acceleration/deceleration determining circuit determines whether an inverter is in acceleration/deceleration or not according to whether an absolute value of deviation between an speed instruction value and a speed detection value is not less than a specified value or not without requiring any particular sensor.

In the vector-controlling inverter device in a motor according to the invention, a continuous torque mode in which desired characteristics for continuous rated torque is obtained is automatically selected in a case where the inverter is not accelerated nor decelerated, a short time torque mode in which desired characteristics for short time rated torque is obtained is automatically selected in a case where the inverter is accelerated or decelerated, and apportion between a current detection value for torque and current-for-excitation detection value obtained from a primary current detection value is switched between the short time torque mode and continuous torque mode.

In the vector-controlling inverter device in a motor according to the invention, apportion between a current detection value for torque and current-for-excitation detection value obtained from a primary current detection value is changed according to setting of a gain by means of each of gain circuits.

In the vector-controlling inverter device in a motor according to the invention, a PWM frequency switching instruction circuit switches a PWM frequency for a pulse width modulating circuit for inverter control according to switching of the rated torque characteristics of a motor by changing the apportion between a current detection value for torque and current-for-excitation detection value obtained from a primary current detection value.

In the vector-controlling inverter device in a motor according to the invention, a PWM frequency switching instruction circuit sets a PWM frequency to a frequency lower than that in the ordinary mode in the short time torque mode and to a frequency in the ordinary mode in the continuous torque mode.

Other objects and features of this invention will become understood from the following description with reference to the accompanying drawings.

DESCRIPTION OF THE PREFERRED EMBODIMENTS

Figure 1:
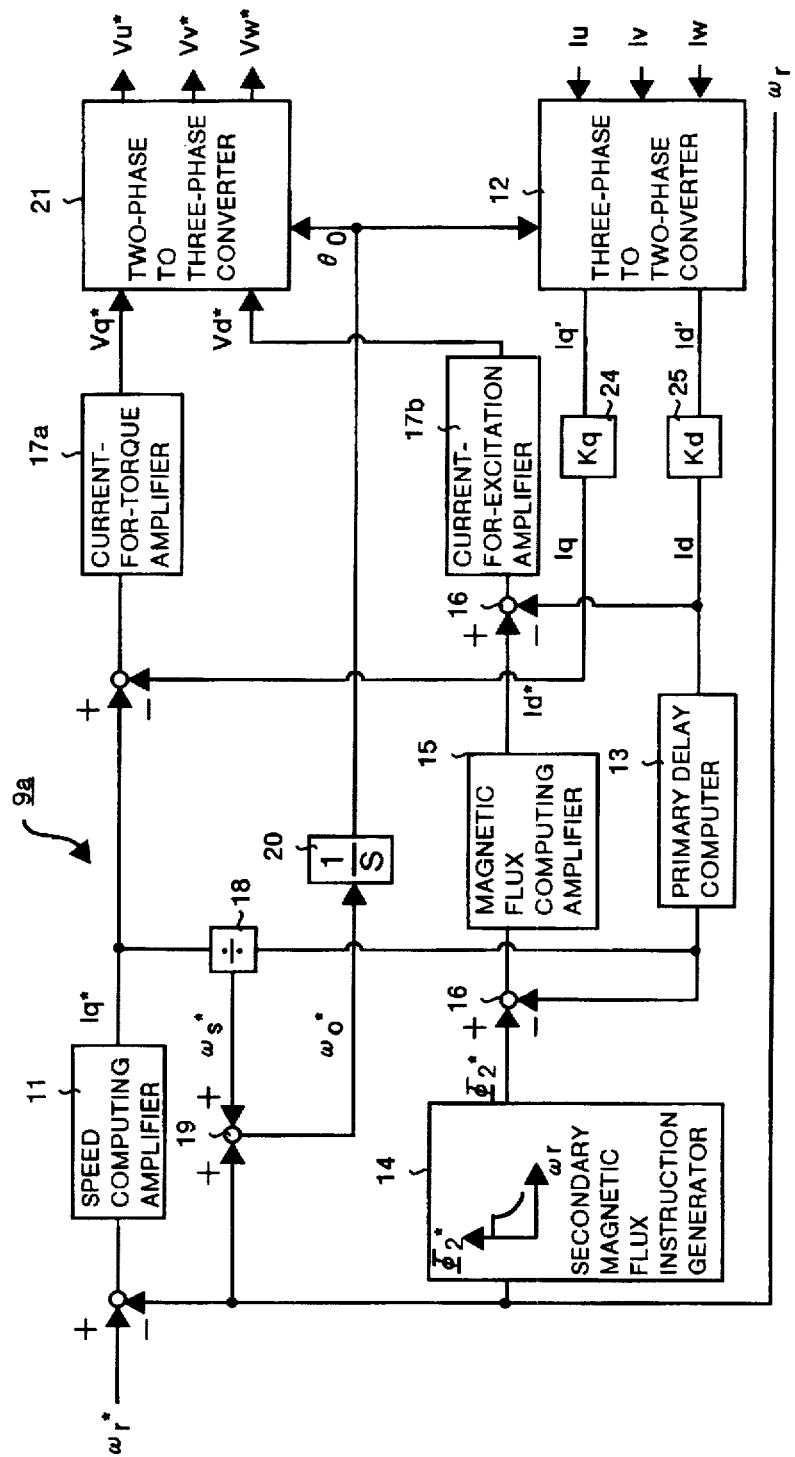
FIG. 1 is a block diagram showing a key section (vector-controlling computing circuit) of Embodiment 1 of a vector-controlling inverter device in a motor according to the present invention.

Detailed description is made hereinafter for embodiments of the present invention with reference to the attached drawings. It should be noted that, in the embodiments of the present invention described below, the same reference numerals are assigned to the same sections as those in the conventional technology described above, and description thereof is omitted herein.

Figure 16:
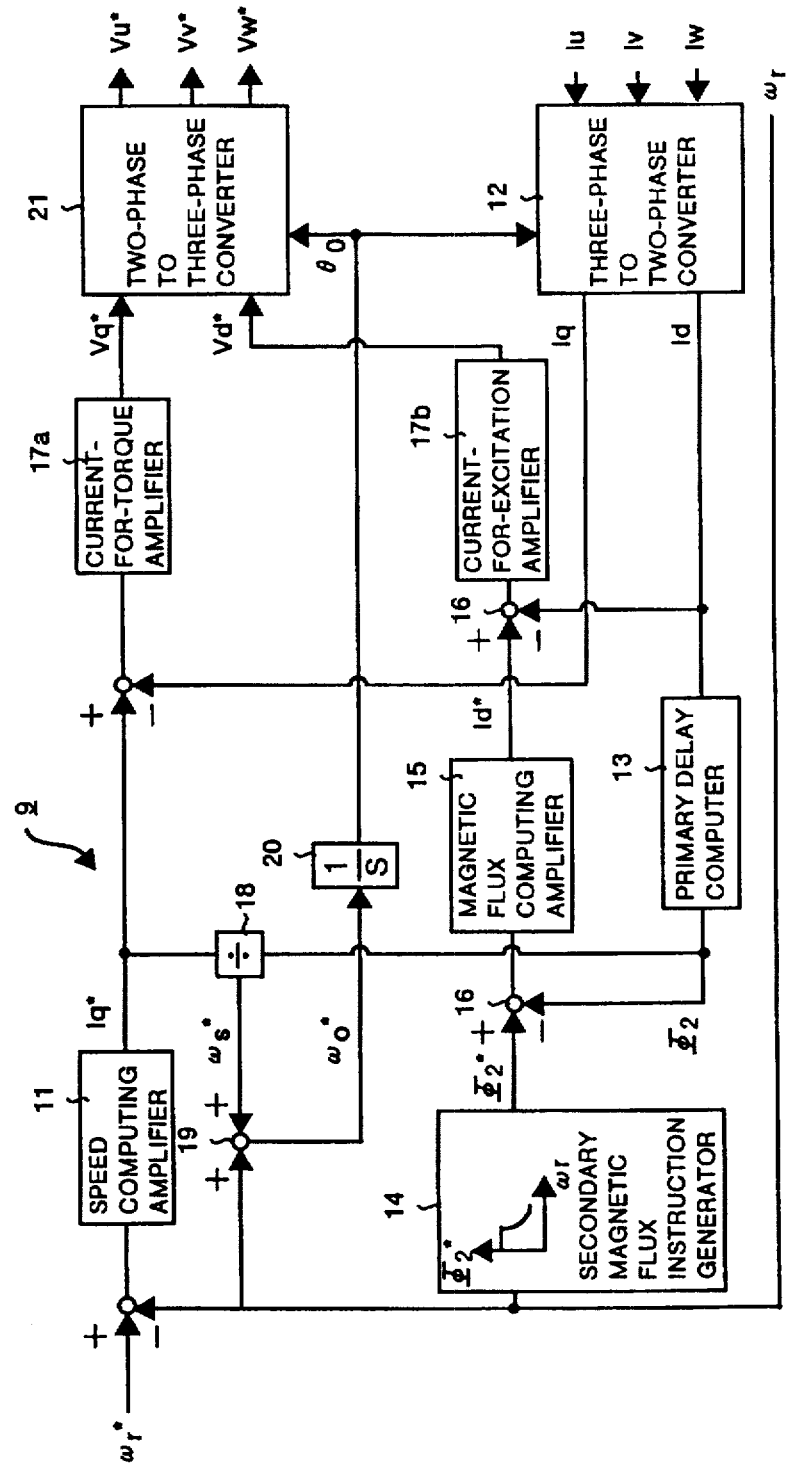
FIG. 16 is a block diagram showing configuration of a vector computing circuit in the vector-controlling inverter device in a motor based on the conventional technology.
Figure 17:
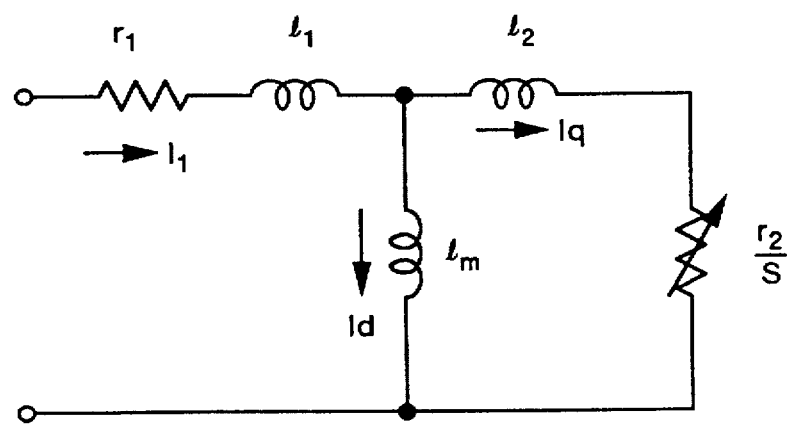
FIG. 17 is a circuit diagram showing an equivalent circuit of a motor.

FIG. 1 shows Embodiment 1 of the vector-controlling inverter device according the present invention. This vector-controlling inverter device is a vector controlling/computing controlling/computing circuit 9 shown in FIG. 16, having an Iq gain circuit 24 for multiplying a detected current-for-torque value Iq' outputted from the three-phase to two-phase converter 12 for subjecting the detection values Iu, Iv, Iw detected by the current detector 7 to three-phase to two-phase conversion, and an Id gain circuit 25 for multiplying the current-for-excitation detection value Id' outputted from the three-phase to two-phase converter 12.

A gain Kq for the Iq gain circuit 24 and gain Kd for the Id gain circuit are set to values different from each other respectively, and generally there is the correlation between the gain Kq for the Iq gain circuit 24 and the gain Kd for the Id gain circuit 25 that the former is smaller than the latter.

Figure 2:
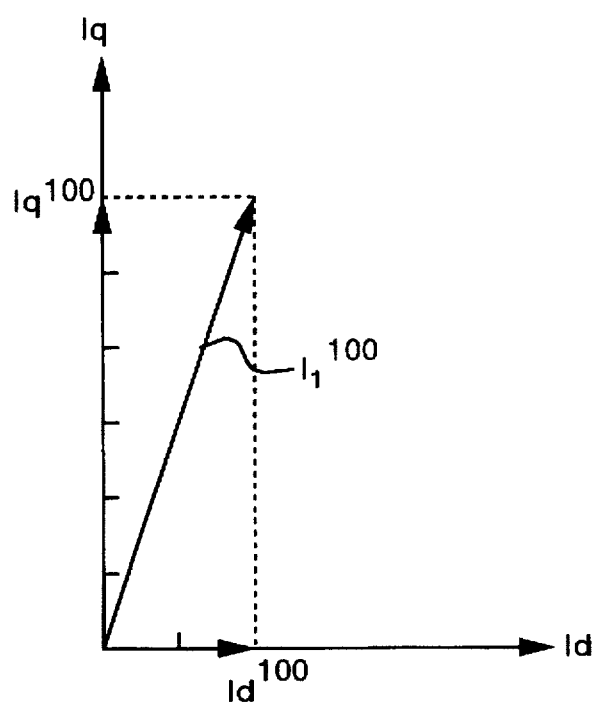
FIG. 2 is a graph showing the principle of operation of the vector-controlling inverter device in a motor according to the present invention.
Figure 18:
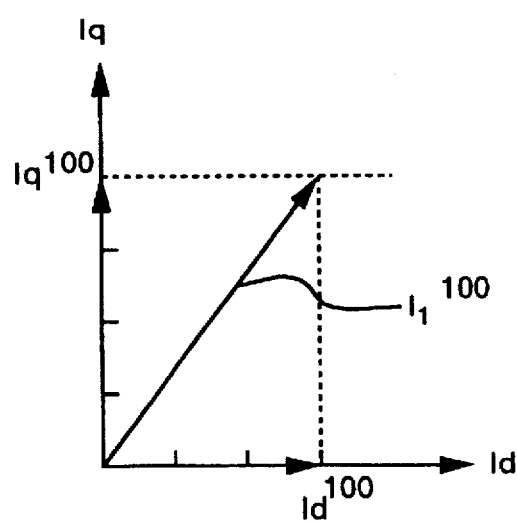
FIG. 18 is a graph showing the principle of operation of the vector-controlling inverter device in a motor based on the conventional technology.
Figure 19:
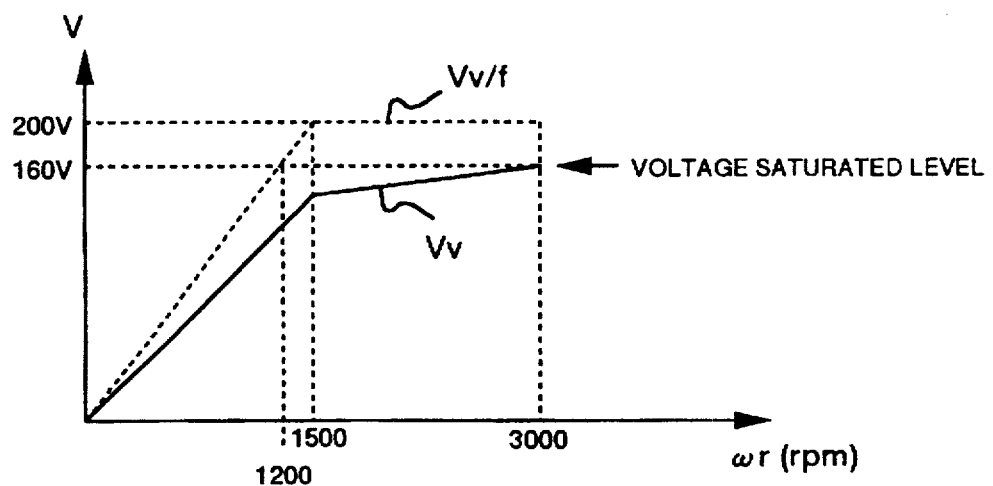
FIG. 19 is a graph showing voltage saturation characteristics in the vector-controlling inverter device in a motor based on the conventional technology.

Next description is made for principles of operations in this embodiment with reference to FIG. 2. FIG. 2 shows, like in FIG. 18, a relation among the primary current $I_1$ in a motor, current-for-torque Iq, and current-for-excitation Id with a d-q coordinate system, but the different of FIG. 2 from FIG. 18 is that a value of the current-for-torque $Iq^{100}$ is different from that of the current-for-excitation $Id^{100}$ for generating the same rated torque. Herein torque generated by the motor is proportionate to a product of Iq by Id.

For this reason, if it is assumed as an example in FIG. 2 that $Iq^{100}$ is equal to 6A and $Id^{100}$ is equal to 2A, the following equation is satisfied:

$$Iq^{100} \cdot Id^{100} = 6 \times 2 = 12$$

In FIG. 18, $Iq^{100} \cdot Id^{100}$ is equal to $4 \times 3 = 12$, which indicates that the two values are identical and torque generated by the motor is constant. It should be noted that the primary current $I_1^{100}$ of the motor when the rated torque is generated is $\sqrt{(4^2+3^2)}=5A$, and in contrast in FIG. 2, $\sqrt{(6^2+2^2)}=6.3A$, which indicates that the value in FIG. 2 is larger.

Also in FIG. 2, values for actual gain Kq and gain Kd are as follows:

Kq=4/6

Kd=3/2

Figure 3:
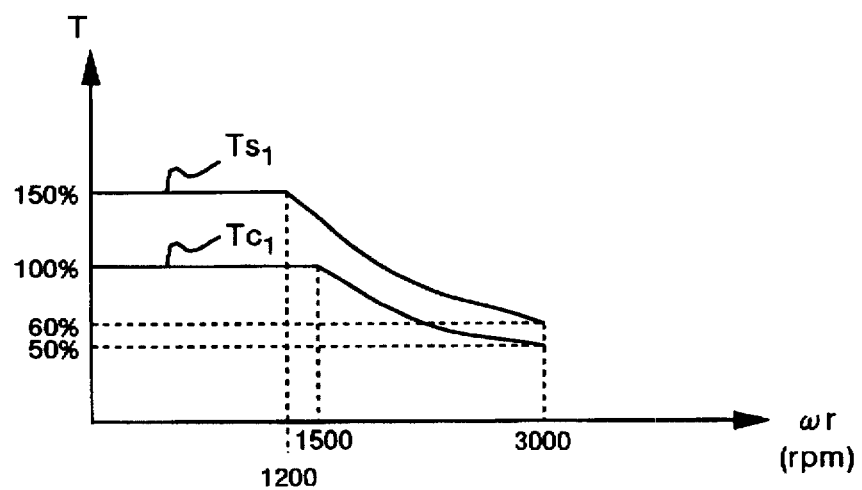
FIG. 3 is a graph showing the principle of operation of the vector-controlling inverter device in a motor according to the present invention.
Figure 4:
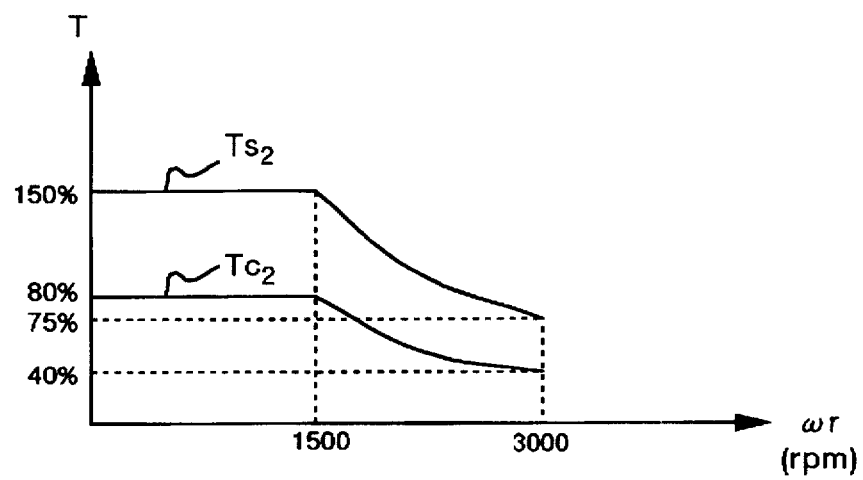
FIG. 4 is a graph showing the principle of operation of the vector-controlling inverter device in a motor according to the present invention.

Next, comparison between the motor rated torque characteristics in FIG. 18 during current distribution and that in FIG. 2 during distribution each during vector control is described with reference to FIG. 3 and FIG. 4. In FIG. 3 and FIG. 4, $Ts_1$ and $Ts_2$ indicate examples of short time rated torque characteristics respectively, while $Tc_1$ and $Tc_2$ indicate examples of continuous rated torque characteristics respectively.

During the normal V/F control, characteristics for the continuous rated torque is as indicated by the sign $Tc_1$ in FIG. 3 and characteristics for the short time rated torque is as indicated by the sign $Ts_2$ in FIG. 4. The vector-controlling inverter according to the present invention realizes even during vector control the rated torque characteristics identical to that during the V/F control.

FIG. 3 shows the motor torque characteristics in a case where vector control is executed during distribution of a current as shown in FIG. 18. In this figure, the motor terminal voltage is not saturated while the continuous rated torque is generated, and in addition the motor current is also identical to that during V/F control, so that the completely same torque as that during V/F control can be generated in the entire speed range. However, in a case of short time torque, a phenomenon of voltage saturation is generated at a speed lower than the rated speed (=1500 rpm), and for instance, the torque becomes lower at a rotational speed of 1200 rpm or more.

FIG. 4 shows the motor torque characteristics in a case where vector control is executed during distribution of a current as shown in FIG. 2. In this case, the motor current during generation of the same torque becomes larger as compared to that shown in FIG. 18 (namely a current value of a motor becomes larger as compared to that during V/F control) and a quantity of heat emitted from the motor also becomes larger, so that the continuous torque drops to around 80% due to restriction over rise of temperature in the motor, but as for the short time torque, 150% torque can be generated like that during V/F control in the entire speed range. This phenomenon occurs because the motor terminal voltage is not saturated even when 150% torque is generated. The reason is as described below.

It should be noted that, in a case of the motor rated torque characteristics based on the current-for-torque Id and current-for-excitation Id set as shown in FIG. 18, desired characteristics for continuous rated torque is obtained as shown in FIG. 3, so that this operation mode is described as continuous torque mode hereinafter. Also in the motor rated torque characteristics based on the current-for-torque Id and current-for-excitation Id set as shown in FIG. 2, desired characteristics for the short time rated torque as shown in FIG. 4 can be obtained, so that this operation mode is described as short time torque mode hereinafter.

The motor terminal voltage V is expressed by the following expression:

$$V = \sqrt{[(Vq)^2 + (Vd)^2]} \quad (1)$$

$$= \sqrt{\{(r_1 \cdot Iq)^2 + (\omega 0 \cdot \sigma \cdot L_1 \cdot Iq)^2 + (r_1 \cdot Id)^2 + (\omega 0 \cdot L_1 \cdot Iq)^2 - 2r_1 \cdot Iq \cdot Id \cdot \omega 0 \cdot \sigma L_1 + 2r_1 \cdot Iq \cdot Id \cdot \omega 0 \cdot L_1\}}$$

Herein, $$\sigma = 1 - M^2/L_1 \cdot L_2 \quad (2)$$

$$L_1 = lm + l_1 \quad (3)$$

$$L_2 = lm + l_2 \quad (4)$$

When the expression (1) is deformed, the following expression is obtained:

$$V = \sqrt{\{r_1^2 \cdot (Iq^2 + Id^2) + 2r_1 \cdot Iq \cdot Id \cdot \omega 0 \cdot L_1 \cdot (1 - \sigma) + \omega 0^2 \cdot L_1^2 \cdot (\sigma^2 \cdot Iq^2 + Id^2)\}} \quad (5)$$

From the expression (5), the first term and third term in the expression (5) are influenced when a product of the current-for-torque Iq and current-for-excitation Id, namely the torque is kept constant and at the same time apportion between the current-for-torque Iq and current-for-excitation Id is changed.

Herein, the higher the speed is, the higher a motor terminal voltage in the motor is, because of change in the $\omega 0$ in the second and third terms.

For this reason, when apportion between the current-for-torque Iq and current-for-excitation Id is changed, resultantly the third term gives direct effects to saturation of the motor terminal voltage. Because of $\sigma << 1$, the third term is little influenced by a value of the current-for-torque Id, and is dependent on a value of the current-for-excitation Id.

So by making smaller a value of the current-for-excitation Id as compared to the current value, the terminal voltage in the motor becomes lower, and voltage saturation hardly occurs.

In this case, however, it can be considered that, if a value of the current-for-excitation Id is made excessively smaller, the following problems occur:

(1) a value of the primary current in the motor becomes excessively high, which causes increase of a capacity of the inverter as well as increase of inverter cost, and (2) as slip in a motor is proportionate to Iq/Id, the slip becomes excessively large, which causes increase in a quantity of heats emitted from a rotor, and for this reason, it is desirable that a value of the current-for-excitation Id should be set to a limit value not restricted by voltage saturation.

In the present invention, it is important for high precision inverter control to decide apportion between the current-for-torque Iq and current-for-excitation Id by means of appropriately apportioning a detected current value between the detected current-for-torque Iq' and a current-for-excitation detection value Id' obtained from the primary current value according to a prespecified percentage.

As an invention analogous to the present invention, there is a control unit for an induction motor disclosed in Japanese Utility Model Laid-open Publication No. HEI 4-111298, so that next description is made for difference between the present invention and the technology disclosed in this publication.

The control unit disclosed in Japanese Utility Model Laid-open Publication No. HEI 4-111298 enables efficient running by changing apportion between a current-for-excitation and current-for-torque instruction keeping an output torque at a constant level, and the point that apportion between a current-for-excitation and current-for-torque instruction is changed is analogous to the present invention.

However, the control unit disclosed in Japanese Utility Model Laid-open Publication No. HEI 4-111298 changes apportion between a current-for-excitation and current-for-torque instruction by changing a gain (multiplying actor) of each current instruction value, so that there are the problems as described below.

Namely, to realize a complicated control such as vector control, response with software for a microprocessor is indispensable, but in this case, it is necessary to raise the resolution of internal computing to the maximum level to improve the control precision. For this reason, generally to insure the maximum resolution, an instruction value for a current-for-excitation and an instruction value for a current-for-torque are required to be normalized so that, for instance, a hexadecimal value of 7FFF (which overflows at 8000) is given when the rated torque is generated.

In the control unit disclosed in Japanese Utility Model Laid-open Publication No. HEI 4-111298, this instruction value is multiplied by the gain, and for instance in a case where a current-for excitation instruction value is changed by 1.5 times and a current-for-torque instruction value is changed by 1/1.5 times, it is necessary to previously set a current-for-excitation instruction value before change to a value of 7FFF×1/1.5 so that the value will not overflow after change. Also even if a current-for-torque instruction value is set to 7FFF before change, the value is multiplied by 1/1.5 times, so that the resolution of 7FFF (1/1.5) is obtained.

As described above, before or after change, a resolution of either a current-for-excitation instruction or a current-for-torque becomes lower, so that the torque control precision becomes lower with torque ripple increased or with the torque generation precision lowered. For the reasons as described above, desired torque characteristics can not be obtained with high precision in a stable condition.

In contrast, in the present invention, apportion between a current-for-excitation instruction value and a current-for-torque instruction value does not change before and after change, and instead of it apportion between a current-for-excitation detection value and a current-for-torque detection value is changed. For this reason, both a current-for-excitation instruction value and a current-for-torque instruction value are kept at the maximum resolution before and after change, and the control precision for torque never becomes lower, so that desired torque characteristics can be obtained with high precision in a stable condition.

Figure 5:
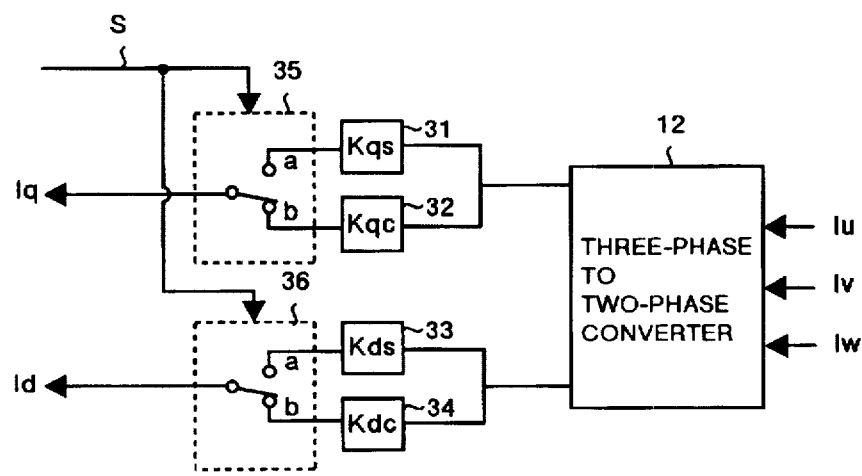
FIG. 5 is a block diagram showing a key section of Embodiment 2 of the vector-controlling inverter device in a motor according to the present invention.

FIG. 5 shows a key section in the vector-controlling inverter device according to Embodiment of the present invention. It should be noted that, in FIG. 5, the same reference numerals are assigned to sections corresponding to those in FIG. 1.

The inverter device according to Embodiment 2 of the present invention comprises an Iq gain circuit 31 (gain Kqs) for short time torque mode as well as an Iq gain circuit 32 (gain Kqc) for continuous torque mode, an Id gain circuit 33 (gain Kds) for short time torque mode as well as an Id gain circuit 34 (gain Kdc) for continuous torque mode, a torque characteristics select switch 35 for switching to and using either the Iq gain circuit 31 or Iq gain circuit 33, and another torque characteristics select switch 36 for switching to and using either the Id gain circuit 33 or the Id gain circuit 34 (gain Kdc) for continuous torque mode, and the torque characteristics select switches 35, 36 make determination as to whether the current operating mode is the short time torque mode or continuous torque mode and select the corresponding side (side a or side b) by turning ON or OFF the torque characteristics select signal S given from an external instructing device not shown herein.

Figure 6:
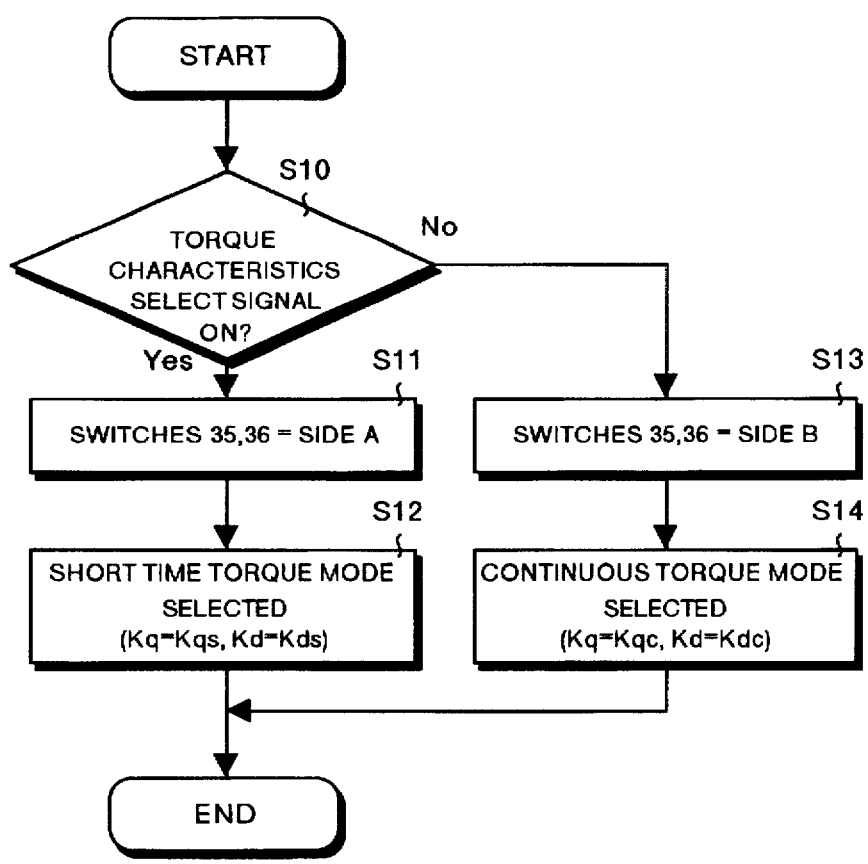
FIG. 6 is a flow chart showing operations of the vector-controlling inverter device in a motor according to Embodiment 2.

Next, a description is made for operations of the inverter device according to this embodiment of the present invention with reference to the flow chart shown in FIG. 6. At first, determination is made as to whether the torque characteristics select signal S, which is an input signal from outside, is ON or not (step 10).

If it is determined that the torque characteristics select signal S is ON (step S10 affirmative), the switches 35, 36 are switched to the side a (step S11), and the Iq gain circuit 31 (gain Kqs) and Id gain circuit 33 (gain Kds) each for short time torque mode are selected (step S12).

In contrast, if it is determined that the torque characteristics select signal S, which is an input signal from outside, is OFF (step S10 negative), the switches 35, 36 are switched to the side b (step S13) and the Iq gain circuit 32 (gain Kqc) and Id gain circuit 34 (gain Kdc) each for continuous torque mode are selected (step S14).

With the present invention, if it is determined that the torque characteristics select signal S, which is an input signal from outside, is OFF, the continuous torque mode is selected, and the continuous torque characteristics for a general-purpose motor can be obtained by means of vector control, and if it is determined that the input signal from outside is ON, the short time torque mode is selected, and the short time torque characteristics for a general-purpose motor can be obtained.

For the reasons as described above, by appropriately combining the two described above, desired continuous rated torque and short time rated torque can be obtained also by means of vector control like in a case of V/F control.

Figure 7:
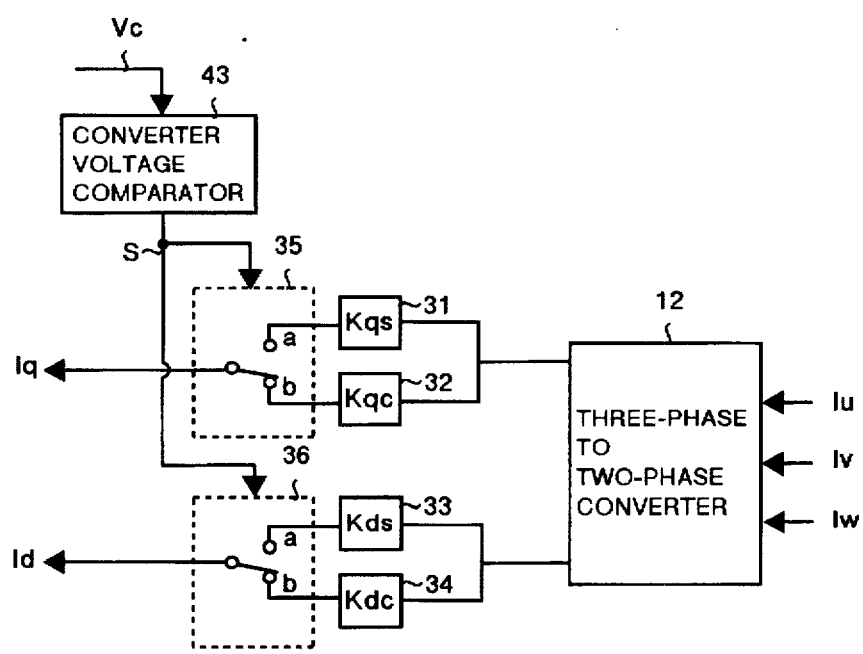
FIG. 7 is a block diagram showing a key section of Embodiment 3 of the vector-controlling inverter device in a motor according to the present invention.

FIG. 7 shows a key section of the vector-controlling inverter device according to Embodiment 3 of the present invention. It should be noted that, in FIG. 7, the same reference numerals are assigned to section corresponding to those in FIG. 5.

Figure 15:
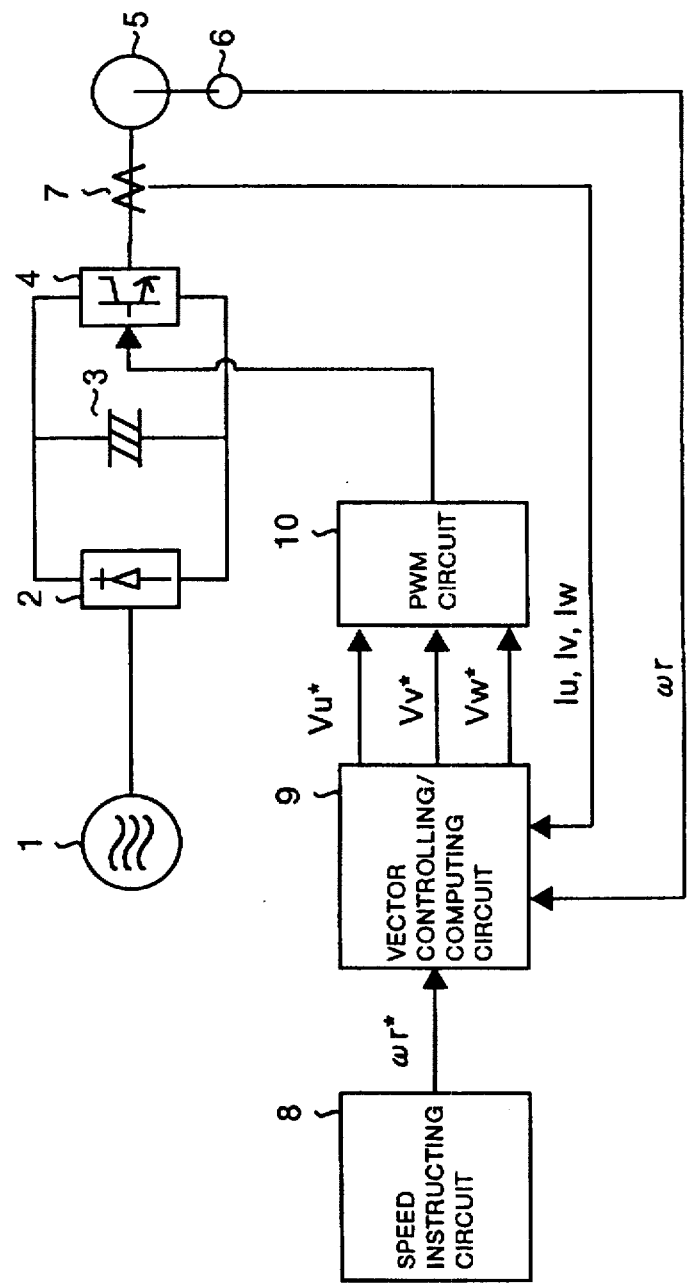
FIG. 15 is a block diagram showing general configuration of a vector-controlling inverter device in a motor based on the conventional technology.

In this embodiment, a converter voltage comparator 43 is provided. The converter voltage comparator 43 receives a voltage detected from both edges of the filter 3 for smoothing a DC voltage (Refer to FIG. 15) as a converter voltage Vc, and turns ON the torque characteristics select signal S if the converter voltage Vc is more than a specified voltage, and turns OFF the torque characteristics select signal S if the converter voltage Vc is lower than the specified voltage.

Figure 8:
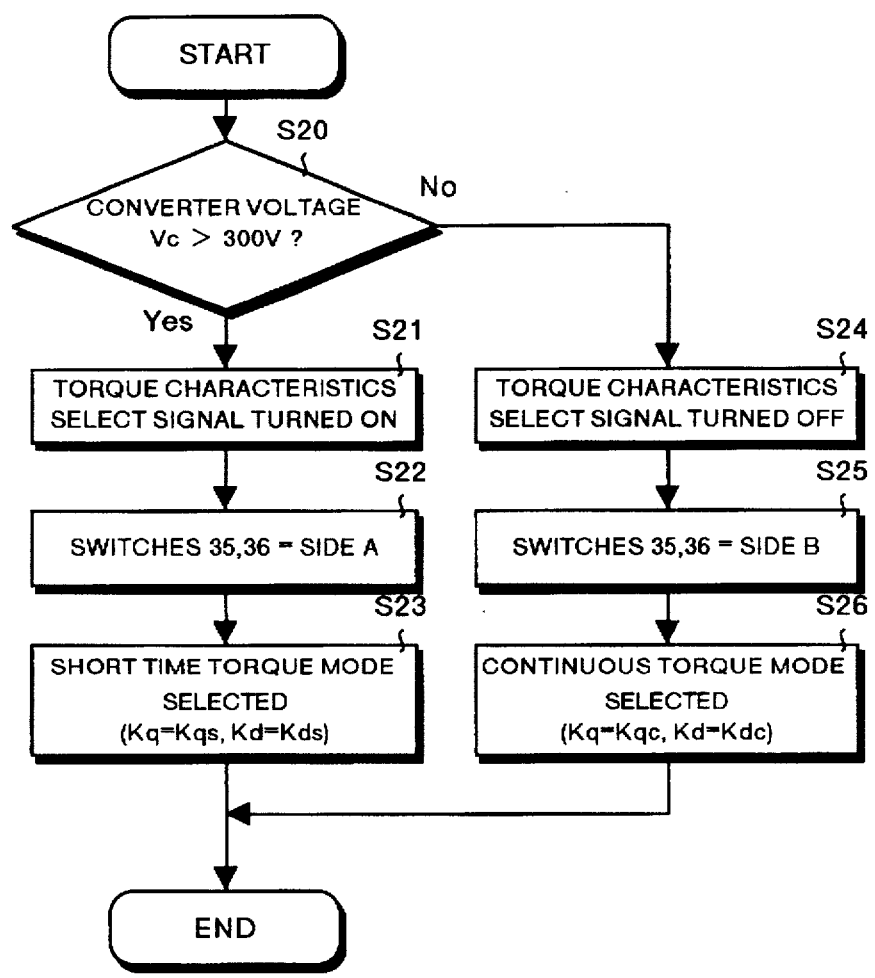
FIG. 8 is a flow chart showing operations of the vector-controlling inverter device in a motor according to Embodiment 3.

Next description is made for operations of the inverter device according to this embodiment with reference to the flow chart shown in FIG. 8. At first, determination is made as to whether the converter voltage detection value Vc is not less than a specified voltage (for instance, 300 V) or not (Step S20).

If the converter voltage detection value Vc is not less than a specified value (step S20 affirmative), the torque characteristics select signal S is turned ON (step S21), the switches 35, 36 are switched to the side a (step S22), and the Iq gain circuit 31 (gain Kqs) and Id gain circuit 33 (gain Kds) each for short time torque mode are selected (step S23).

In contrast, if the converter voltage detection value Vc is less than the specified voltage (step S20 negative), the torque characteristics select signal S is turned OFF (step S24), the switches 35, 36 are switched to the side b (step S25), and the Iq gain circuit 32 (gain Kqc) and Id gain circuit 34 (gain Kdc) each for continuous torque mode are selected (step S26).

With this invention, in a case where a converter voltage is low and the motor terminal voltage is easily saturated because of, for instance, low supply voltage, the continuous torque mode is automatically selected, which makes it possible to obtain the continuous torque characteristics for a general-purpose motor by means of vector control. In contrast, in a case where the supply voltage is high and the motor terminal voltage is hardly saturated, the short time torque mode is automatically selected, which makes it possible to obtain the short time torque characteristics for a general-purpose motor by means of vector control.

For this reason, also in this case, by appropriately combining the two, also by means of vector control, desired continuous rated torque and short time rated torque can be obtained like by means of V/F control.

Figure 9:
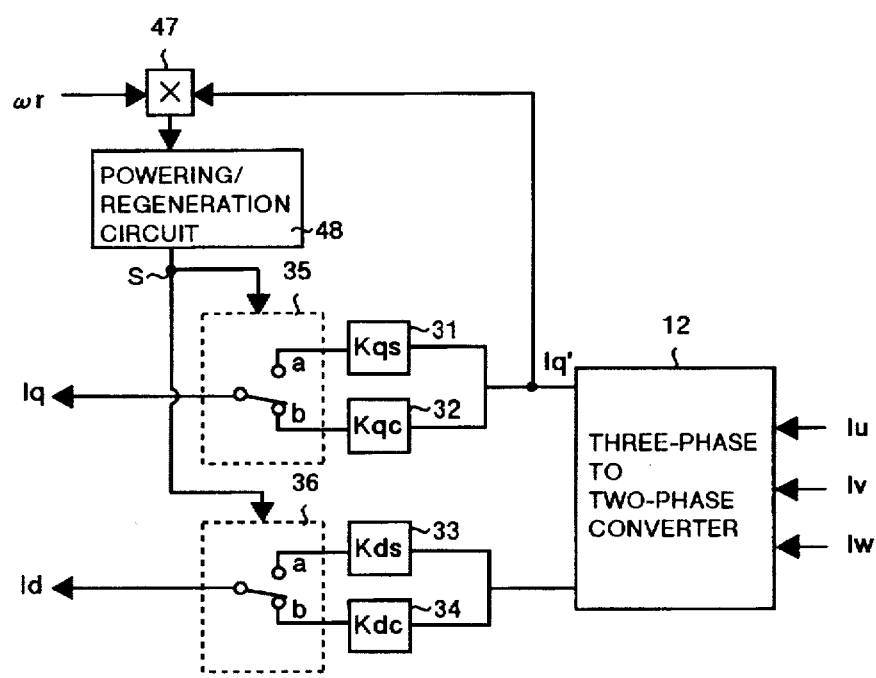
FIG. 9 is a block diagram showing a key section of Embodiment 4 of the vector-controlling inverter device in a motor according to the present invention.

FIG. 9 shows a key section of the vector-controlling inverter device according to Embodiment 4 of the present invention. It should be noted that, in FIG. 9, the same reference numerals are assigned to sections corresponding to those in FIG. 5.

The vector-controlling inverter device according to this embodiment has a multiplier 47 for multiplying a speed detection value ωr outputted from the speed detector 6 with a current-for-torque detection value Iq' outputted from the three-phase to two-phase converter 12, and a powering/regeneration determining circuit 48, and the powering/regeneration determining circuit 48 turns ON the torque characteristics select signal S when a product obtained through multiplication by the multiplier 47 is negative, and turns OFF the torque characteristics select signal S if the product is positive.

Figure 10:
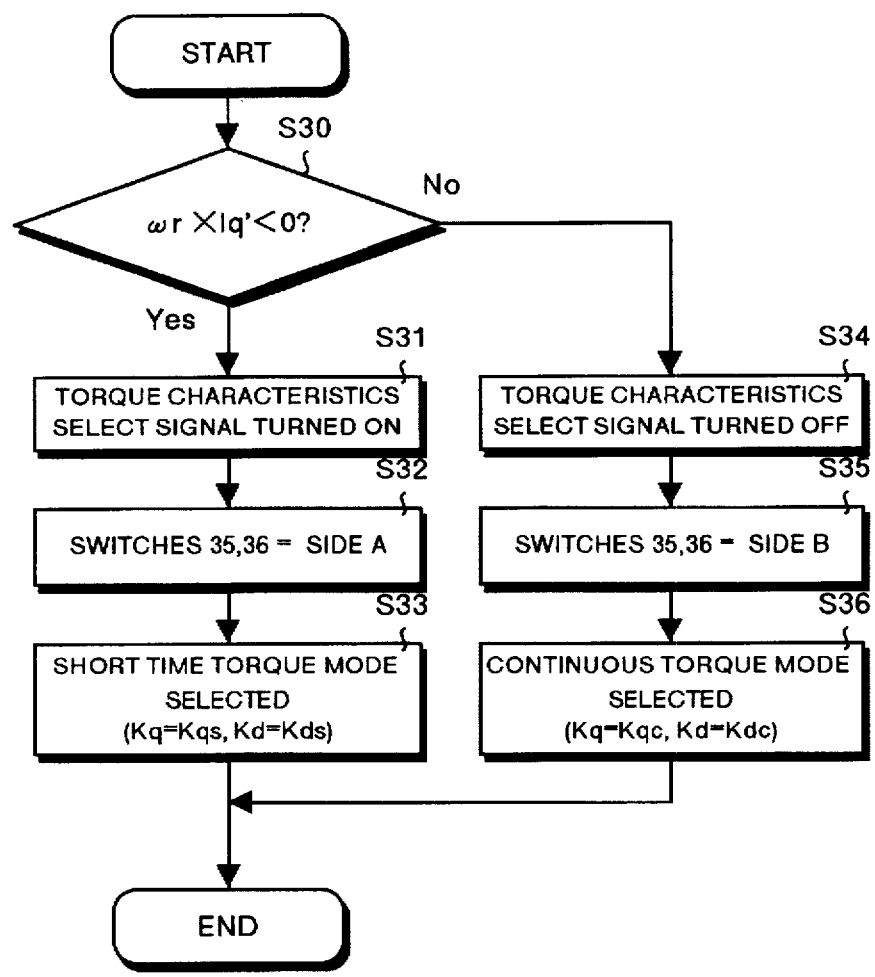
FIG. 10 is a flow chart showing operations of the vector-controlling inverter device in a motor according to Embodiment 4.

Next, a description is made for operations of the inverter device according to this embodiment with reference to the flow chart shown in FIG. 10. At first determination is made as to whether a product of the speed detection value ωr and the current-for-torque detection value Iq' is negative or not (step S30).

If the product is negative (regeneration mode) (step S30 affirmative), the torque characteristics select signal S is turned ON (step S31), the switches 35, 36 are switched to the side a (step S32), and the Iq gain circuit 31 (gain Kqs) and Id gain circuit 33 (gain Kds) each for the short time torque mode are selected (step S33).

If the product is positive (powering mode) (Step S30 negative), the torque characteristics select signal S is turned OFF (step S34), the switches 35, 36 are switched to the side b (step S35), and the Iq gain circuit 32 (gain Kqc) and Id gain circuit 34 (gain Kdc) each for the continuous torque mode are selected (step S36).

With this invention, in a state where a converter voltage has dropped during powering and the motor terminal voltage is easily saturated, the continuous torque mode is automatically selected, and the continuous torque mode for a general-purpose motor can be obtained by means of vector control. In contrast, in a state where the converter voltage is high and the motor terminal voltage is hardly saturated, the short time torque mode is automatically selected, and the short time torque mode for a general-purpose motor can be obtained by means of vector control.

For this reason, also in this case, by appropriately combining the two types of operating mode, desired continuous rated torque and desired short time rated torque can be obtained by means of vector control like in a case of V/F control.

Figure 11:
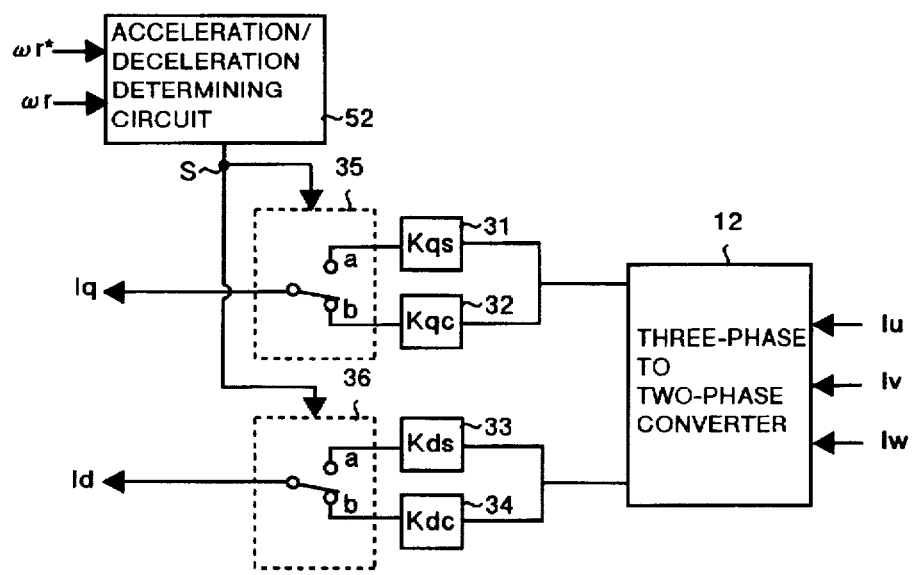
FIG. 11 is a block diagram showing a key section of Embodiment 5 of the vector-controlling inverter device in a motor according to the present invention.

FIG. 11 shows a key section of the vector-controlling inverter device according to Embodiment 5 of the present invention. It should be noted that, also in FIG. 11, the same reference numerals are assigned to sections corresponding to those in FIG. 5.

In this embodiment, there is provided a acceleration/deceleration determining circuit 52. The acceleration/deceleration determining circuit 52 receives a speed instruction value ωr* and a speed detection value ωr, determines that the current operating mode is in acceleration/deceleration and turns ON the torque characteristics select signal S if an absolute value of deviation between the speed instruction value ωr* and the speed detection value ωr is not less than a specified value, and determines that the current operation is in normal running, and turns OFF the torque characteristics select signal S if the absolute value of the deviation between the speed instruction value ωr* and the speed detection value ωr is less than the specified value.

Figure 12:
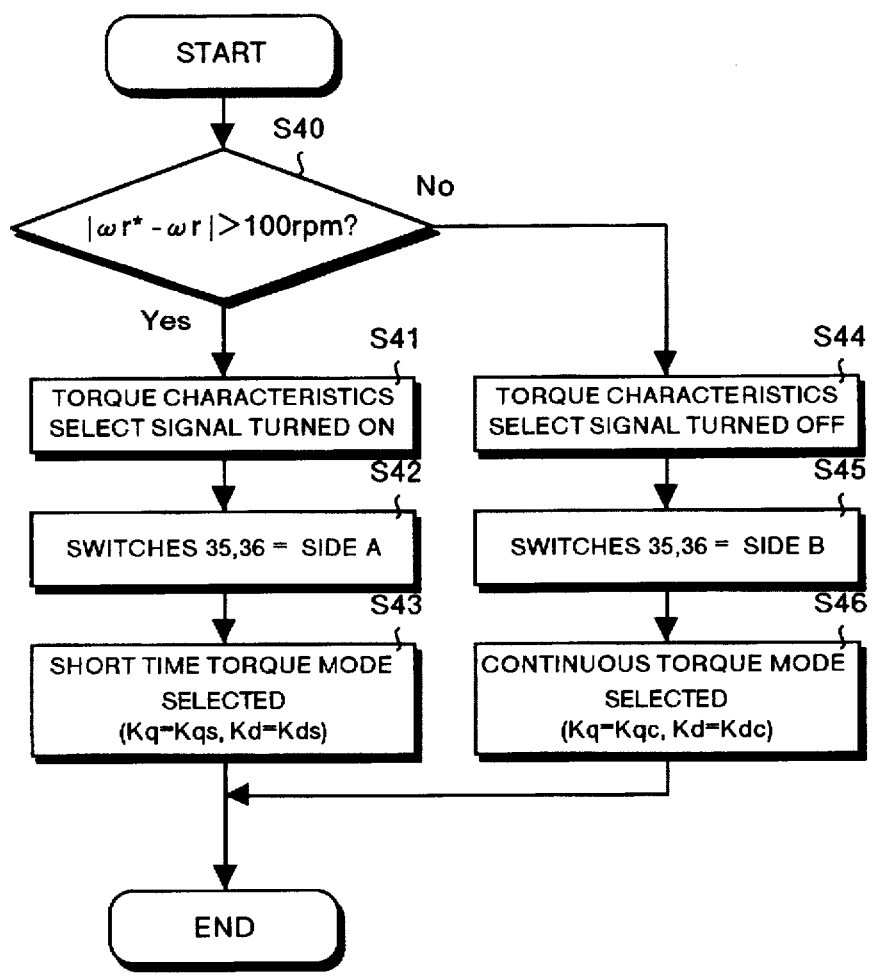
FIG. 12 is a flow chart showing operations of the vector-controlling inverter device in a motor according to Embodiment 5.

Next description is made for operations of the inverter device according to this embodiment with reference to the flow chart shown in FIG. 12. At first determination is made as to whether an absolute value of deviation between the speed instruction value ωr* and the speed detection value ωr is not less than a specified value, (for instance, 100 rpm), or not, (step S40).

If the absolute value of the deviation between the speed instruction value ωr* and the speed detection value ωr is not less than a specified value (step S40 affirmative), it is determined that the current operating mode is in acceleration/deceleration. In this case, the torque characteristics select signal S is turned ON (step S41), the switches 35, 36 are switched to the side a (step S42), and the Iq gain circuit 31(gain Kqs) and Id gain circuit 33 (gain Kds) each for the short time torque mode are selected (step S43).

If the absolute value of the deviation between the speed instruction value ωr* and the speed detection value ωr is less than the specified value (step S40 negative), it is determined that the current operating mode is in normal running. In this case, the torque characteristics select signal S is turned OFF (step S44), the switches 35, 36 are switched to the side b (step S45), and the Iq gain circuit 32 (gain Kqc) and Id gain circuit 34 (gain Kdc) each for continuous torque mode are selected (step S46).

With this invention, In the operating mode other than acceleration or deceleration in which continuous torque is preferred to short time torque, namely in the normal running mode, the continuous torque characteristics for a general-purpose motor can be obtained by means of vector control, and in the acceleration/deceleration mode which is required to be finished within a short period of time, the short time torque characteristics for a general-purpose motor can be obtained by means of vector control.

As a result, also in this case, by appropriately combining the two types of operating mode, the continuous rated torque as well as short time rated torque can be obtained also by means of vector control like in a case of V/F control.

Figure 13:
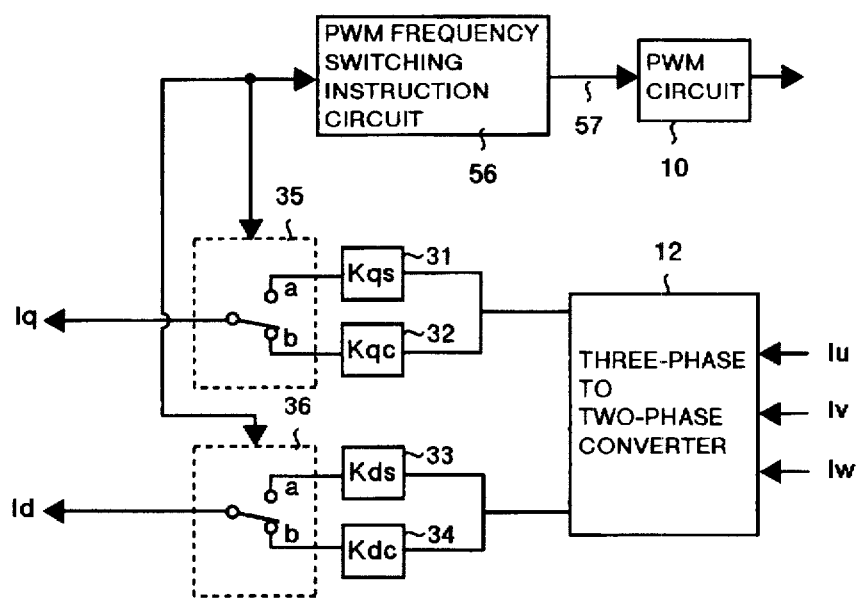
FIG. 13 is a block diagram showing a key section of Embodiment 6 of the vector-controlling inverter device in a motor according to the present invention.

FIG. 13 shows a key section of the vector-controlling inverter device according to Embodiment 6 of the present invention. It should be noted that, also in FIG. 13, the same reference numerals are assigned to sections corresponding to those in FIG. 5.

In this embodiment, there is provided a PWM frequency switching instruction circuit 56 for making determination as to which of the side a and side b the torque characteristics select switches 35, 36 have been switched to and transmitting a PWM frequency switching signal 57 to the PWM circuit 10. The PWM frequency switching instruction circuit 56 outputs to the PWM circuit 10 a PWM frequency switching instruction requiring a frequency lower than that in the normal operation if the current operating mode is the short torque mode in which the torque characteristics select switches 35, 36 have been switched to the side a, and also outputs to the PWM circuit 10 a PWM frequency switching instruction requiring a frequency in the normal mode if the current operating mode is the continuous mode in which the torque characteristics select switches 35, 36 have been switched to the side b.

Figure 14:
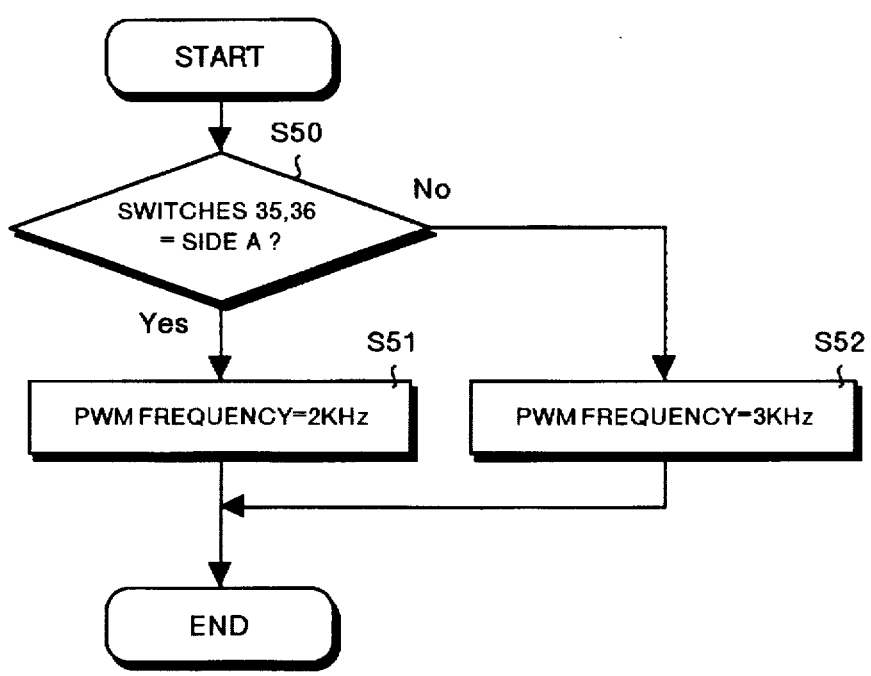
FIG. 14 is a flow chart showing operations of the vector-controlling inverter device in a motor according to Embodiment 6.

Next description is made for operations of the inverter device in this embodiment with reference to FIG. 14. At first determination is made as to whether the torque characteristics select switches 35, 36 have been switched to the side a or not (step S50).

If the torque characteristics select switches 35, 36 have been switched to the side a (step S50 affirmative), namely if the current operating mode is the short time torque mode, a PWM frequency for the PWM circuit 10 is set to a frequency lower than that in the normal operation (for instance, 2 KHz)

(step S51), and if the torque characteristics select switches 35, 36 have been switched to the side b (step S50 negative), namely if the current torque mode is the continuous torque mode, a PWM frequency for the PWM circuit 10 is set to a frequency in the normal operation (for instance, 3 KHz) (step S52).

With this invention, in the continuous torque mode in which the primary current is lower than that in the short time torque mode, an ordinary PWM frequency is used, and in the short time torque mode in which the primary current is higher than that in the continuous torque mode, a PWM frequency is set to a lower value to suppress switching loss in the inverter power element. With this feature, it is possible to prevent a basic body of an inverter from becoming large. It should be noted that gain switching with the torque characteristics select switches 35, 36 in this embodiment may be executed according to any of the methods described in Embodiment 2 to Embodiment 5.

The above description assumes use of a vector-controlling inverter device which runs a motor with a speed detector controlling vectors, but this invention cal also be applied to other systems in which a motor without a speed detector is run under vector control, namely in which a motor is run under so-called speed detector-less vector control, so that the present invention is not limited to vector control for a motor with a speed detector.

As understood from the above description, in the method of controlling vectors in a motor according to the present invention, a current-for-torque and a current-for-excitation are apportioned in a specified ratio by apportioning a current detection value between a current detection value for torque and a current detection value for excitation obtained from a primary current detection value in a specified ratio, and the rated torque characteristics of the motor is changed, so that vector-controlling driving becomes possible by removing any effect of voltage saturation even when a general-purpose motor is driven, which makes it possible to build up a low-cost inverter-controlled system. Also both of a current-for-excitation instruction value and current-for-torque instruction can always be kept at the maximum resolution regardless of change of the apportion between the current-for-torque and current-for-excitation detection value, and precision in control of torque does not drop, which makes it possible to obtain desired high-precision torque characteristics with stability.

In the method of controlling vectors in a motor according to another feature of the present invention, apportion of a current detection value between a current detection value for torque and current-for-excitation detection value obtained from a primary current detection value is changed according to an external input signal, whereby the rated torque characteristics of the motor is switched to discrete adapted characteristics according to the external input signal, so that vector-controlling driving becomes possible by removing any effect of voltage saturation even when a general-purpose motor is driven, which makes it possible to build up a low-cost inverter-controlled system.

In the method of controlling vectors in a motor according to another feature of the present invention, an external input signal discriminates a short time torque mode in which desired characteristics is obtained for a short time rated torque from a continuous torque mode in which desired characteristics for a continuous rated torque is obtained and apportion between a current detection value for torque and current-for-excitation detection value obtained from a primary current detection value is switched between the short time torque mode and continuous torque mode according to the external input signal, so that both of continuous torque characteristics and short time torque characteristics for a general-purpose motor can be obtained by controlling vectors, and a desired continuous rated torque and a desired short time rated torque like those in a V/F control can be obtained by combining the two as required even in a control of vectors. With this feature, vector-controlling driving becomes possible by removing any effect of voltage saturation even when a general-purpose motor is driven, which makes it possible to build up a low-cost inverter-controlled system.

In the method of controlling vectors in a motor according to another feature of the present invention, apportion of a current detection value between a current detection value for torque and current-for-excitation detection value obtained from a primary current detection value is changed according to a converter voltage detection value, whereby the rated torque characteristics of the motor is switched to adapted characteristics according to the converter voltage detection value, so that vector-controlling driving becomes possible by removing any effect of voltage saturation even when a general-purpose motor is driven, which makes it possible to build up a low-cost inverter-controlled system.

In the method of controlling vectors in a motor according to another feature of the present invention, a continuous torque mode in which desired characteristics for a continuous rated torque is obtained is automatically selected in a state where a converter voltage is low and a motor terminal voltage is easily saturated due to a low power voltage, a short time torque mode in which desired characteristics for a short time rated torque is obtained is automatically selected in a state where power voltage is high and a motor terminal voltage is not easily saturated, and apportion between a current detection value for torque and current-for-excitation detection value obtained from a primary current detection value is switched between the short time torque mode and continuous torque mode, so that both of continuous torque characteristics and short time torque characteristics for a general-purpose motor can be obtained by controlling vectors, and a desired continuous rated torque and a desired short time rated torque like those in a V/F control can be obtained by combining the two as required even in a control of vectors. With this feature, vector-controlling driving becomes possible by removing any effect of voltage saturation even when a general-purpose motor is driven, which makes it possible to build up a low-cost inverter-controlled system.

In the method of controlling vectors in a motor according to another feature of the present invention, apportion between a current detection value for torque and current-for-excitation detection value obtained from a primary current detection value is changed according to whether a motor is in powering or in regeneration, whereby the rated torque characteristics for the motor is switched to discrete adapted characteristics according to whether the motor is in powering or in regeneration, so that vector-controlling driving becomes possible by removing any effect of voltage saturation even when a general-purpose motor is driven, which makes it possible to build up a low-cost inverter-controlled system.

In the method of controlling vectors in a motor according to another feature of the present invention, determination is made as to whether a mode is in a powering mode or in a regeneration mode according to whether a product of multiplication between a speed detection value for the motor and a current detection value for torque is positive or negative, so that a particular sensor is not required for the determination.

In the method of controlling vectors in a motor according to another feature of the present invention, continuous torque mode is automatically selected so that continuous torque characteristics can be obtained by controlling vectors in a state where a converter voltage is lowered due to powering mode and a motor terminal voltage is easily saturated, and a short time torque mode is automatically selected so that short time torque characteristics for the general-purpose motor can be obtained by controlling the vectors in a state where the converter voltage is high due to regeneration mode and the motor terminal voltage is not easily saturated, so that vector-controlling driving becomes possible by removing any effect of voltage saturation even when a general-purpose motor is driven, which makes it possible to build up a low-cost inverter-controlled system.

In the method of controlling vectors in a motor according to another feature of the present invention, apportion between a current detection value for torque and current-for-excitation detection value obtained from a primary current detection value is changed according to whether a motor is accelerating/decelerating an inverter or not, whereby rated torque characteristics of the motor is switched to discrete adapted characteristics according to whether the inverter is accelerated/decelerated or not, so that vector-controlling driving becomes possible by removing any effect of voltage saturation even when a general-purpose motor is driven, which makes it possible to build up a low-cost inverter-controlled system.

In the method of controlling vectors in a motor according to another feature of the present invention, determination is made as to whether an inverter is accelerated/decelerated or not according to whether an absolute value of deviation between an speed instruction value and a speed detection value is not less than a specified value or not, so that the determination is made without requiring any particular sensor.

In the method of controlling vectors in a motor according to another feature of the present invention, continuous torque characteristics for a general-purpose motor can be obtained by controlling vectors in a mode other than an acceleration/deceleration mode, in which a continuous torque is preferentially selected to a short time torque, and short time torque characteristics for the general-purpose motor can be obtained by controlling the vectors in an acceleration/deceleration mode which is to be completed in a short period of time, so that vector-controlling driving becomes possible by removing any effect of voltage saturation even when a general-purpose motor is driven, which makes it possible to build up a low-cost inverter-controlled system.

In the method of controlling vectors in a motor according to another feature of the present invention, apportion between a current detection value for torque and current-for-excitation detection value is changed by discretely setting a gain for a current detection value for torque and current-for-excitation detection value, so that the apportion between the current detection value for torque and current-for-excitation detection value can easily and accurately be changed.

In the method of controlling vectors in a motor according to another feature of the present invention, a PWM frequency for a pulse width modulating circuit for controlling an inverter is switched according to switching of the rated torque characteristics of a motor by means of changing apportion between a current detection value for torque and current-for-excitation detection value obtained from a primary current detection value, so that a switching loss in inverter power elements can be suppressed and an outside of the main body of inverter can be prevented from upsizing.

In the method of controlling vectors in a motor according to another feature of the present invention, a PWM frequency is set to a frequency in the ordinary mode in the continuous torque mode in which a current is smaller than that in the short time torque mode and to a frequency lower than that in the ordinary mode in the short time torque mode in which a current is larger than that in the continuous torque mode, and for this reason a switching loss in the inverter power element can be suppressed, so that an outside shape of the main body of inverter can be prevented from upsizing.

In the vector-controlling inverter device in a motor according to another feature of the present invention, a current detection value between a current detection value for torque and current-for-excitation detection value obtained from a primary current detection value is apportioned in a specified ratio, whereby the current-for-torque and current-for-excitation detection value are apportioned in the specified ratio, and with this feature the rated torque characteristics of the motor is changed, so that vector-controlling driving becomes possible by removing any effect of voltage saturation even when a general-purpose motor is driven, which makes it possible to build up a low-cost inverter-controlled system.

Also both of a current-for-excitation instruction value and current-for-torque instruction can always be kept at a maximum resolution level regardless of change of the apportion between the current-for-torque and current-for-excitation detection value, and precision in control of torque does not decrease, which makes it possible to obtain desired high-precision torque characteristics with stability.

In the vector-controlling inverter device in a motor according to another feature of the present invention, apportion of a current detection value between a current detection value for torque and current-for-excitation detection value obtained from a primary current detection value is changed according to an external input signal, whereby the rated torque characteristics of the motor is switched to discrete adapted characteristics according to the external input signal, so that vector-controlling driving becomes possible by removing any effect of voltage saturation even when a general-purpose motor is driven, which makes it possible to build up a low-cost inverter-controlled system.

In the vector-controlling inverter device in a motor according to another feature of the present invention, an external input signal discriminates a short time torque mode in which desired characteristics for a short time rated torque is obtained from a continuous torque mode in which desired characteristics for a continuous rated torque is obtained and apportion between a current detection value for torque and current-for-excitation detection value obtained from a primary current detection value is switched between the short time torque mode and continuous torque mode according to the external input signal, so that both of continuous torque characteristics and short time torque characteristics for a general-purpose motor can be obtained by controlling vectors, and a desired continuous rated torque and a desired short time rated torque like those in a V/F control can be obtained by combining the two as required even in a control of vectors. With this feature, vector-controlling driving becomes possible by removing any effect of voltage saturation even when a general-purpose motor is driven, which makes it possible to build up a low-cost inverter-controlled system.

In the vector-controlling inverter device in a motor according to another feature of the present invention, determination is made by the converter voltage comparator as to whether a converter voltage is not less than a specified value or not, and apportion between a current detection value for torque and current-for-excitation detection value obtained from a primary current detection value is changed according to an output signal from the converter voltage comparator and the rated torque characteristics for the motor is switched to adapted characteristics according to a converter voltage detection value, so that vector-controlling driving becomes possible by removing any effect of voltage saturation even when a general-purpose motor is driven, which makes it possible to build up a low-cost inverter-controlled system.

In the vector-controlling inverter device in a motor according to another feature of the present invention, according to a result of comparison with a converter voltage comparator, a continuous torque mode in which desired characteristics for continuous rated torque is obtained is automatically selected in a case where a converter voltage is low, a short time torque mode in which desired characteristics for short time rated torque is obtained is automatically selected in a case where the converter voltage is high, and apportion between a current detection value for torque and current-for-excitation detection value obtained from a primary current detection value is switched between the short time torque mode and continuous torque mode, so that both of continuous torque characteristics and short time torque characteristics for a general-purpose motor can be obtained by controlling vectors, and a desired continuous rated torque and a desired short time rated torque like those in a V/F control can be obtained by combining the two as required even in a control of vectors. With this feature, vector-controlling driving becomes possible by removing any effect of voltage saturation even when a general-purpose motor is driven, which makes it possible to build up a low-cost inverter-controlled system.

In the vector-controlling inverter device in a motor according to another feature of the present invention, determination is made by a powering/regenerating determining circuit as to whether a motor is in powering or in regeneration, apportion between a current detection value for torque and current-for-excitation detection value obtained from a primary current detection value is changed according to a result of determination by the powering/regeneration determining circuit, and the rated torque characteristics for the motor is switched to discrete adapted characteristics according to whether the motor is in powering or in regeneration, so that vector-controlling driving becomes possible by removing any effect of voltage saturation even when a general-purpose motor is driven, which makes it possible to build up a low-cost inverter-controlled system.

In the vector-controlling inverter device in a motor according to another feature of the present invention, a powering/regeneration determining circuit determines whether a mode is in a powering mode or in a regeneration mode according to whether a product of multiplication between a speed detection value for the motor and a current detection value for torque is positive or negative, so that any particular sensor is not required for the determination.

In the vector-controlling inverter device in a motor according to another feature of the present invention, a continuous torque mode in which desired characteristics for a continuous rated torque is obtained is automatically selected in a case of the powering mode, a short time torque mode in which desired characteristics for a short time rated torque is obtained is automatically selected in a case of regeneration mode, and apportion between a current detection value for torque and current-for-excitation detection value obtained from a primary current detection value is switched between the short time torque mode and continuous torque mode, so that vector-controlling driving becomes possible by removing any effect of voltage saturation even when a general-purpose motor is driven, which makes it possible to build up a low-cost inverter-controlled system.

In the vector-controlling inverter device in a motor according to another feature of the present invention, determination is made by an acceleration/deceleration determining circuit as to whether an inverter is in acceleration/deceleration or not, apportion between a current detection value for torque and current-for-excitation detection value obtained from a primary current detection value is changed according to a result of determination by the acceleration/deceleration determining circuit and the rated torque characteristics for the motor is switched to discrete adapted characteristics according to whether the inverter is in acceleration/deceleration or not, so that vector-controlling driving becomes possible by removing any effect of voltage saturation even when a general-purpose motor is driven, which makes it possible to build up a low-cost inverter-controlled system.

In the vector-controlling inverter device in a motor according to another feature of the present invention, an acceleration/deceleration determining circuit determines whether an inverter is in acceleration/deceleration or not according to whether an absolute value of deviation between an speed instruction value and a speed detection value is not less than a specified value or not, so that the determination is made without requiring any particular sensor.

In the vector-controlling inverter device in a motor according to another feature of the present invention, a continuous torque mode in which desired characteristics for continuous rated torque is obtained is automatically selected in a case where the inverter is not accelerated/decelerated, a short time torque mode in which desired characteristics for short time rated torque is obtained is automatically selected in a case where the inverter is accelerated/decelerated, and apportion between a current detection value for torque and current-for-excitation detection value obtained from a primary current detection value is switched between the short time torque mode and continuous torque mode, so that vector-controlling driving becomes possible by removing any effect of voltage saturation even when a general-purpose motor is driven, which makes it possible to build up a low-cost inverter-controlled system.

In the vector-controlling inverter device in a motor according to another feature of the present invention, apportion between a current detection value for torque and current-for-excitation detection value obtained from a primary current detection value is changed according to setting of a gain by means of each of gain circuits, so that the apportion between the current detection value for torque and current-for-excitation detection value can easily and accurately be changed.

In the vector-controlling inverter device in a motor according to another feature of the present invention, a PWM frequency switching instruction circuit switches a PWM frequency for a pulse width modulating circuit for inverter control according to switching of the rated torque characteristics of a motor by changing the apportion between a current detection value for torque and current-for-excitation detection value obtained from a primary current detection value, so that a switching loss in inverter power elements can be suppressed and an outside shape of the main body of inverter can be prevented from upsizing.

In the vector-controlling inverter device in a motor according to another feature of the present invention, a PWM frequency switching instruction circuit sets a PWM frequency to a frequency lower than that in the ordinary mode in the short time torque mode and to a frequency in the ordinary mode in the continuous torque mode, so that a PWM frequency is set to a frequency in the ordinary mode in the continuous torque mode in which a current is smaller than that in the short time torque mode and to a frequency lower than that in the ordinary mode in the short time torque mode in which a current is larger than that in the continuous torque mode, and for this reason a switching loss in inverter power elements can be suppressed, and for this reason an outside shape of the main body of inverter can be prevented from upsizing.

This application is based on Japanese patent application No. HEI 8-105803 filed in the Japanese Patent Office on Apr. 25, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of controlling vectors in a motor by detecting a primary current in the motor driven by an inverter circuit with a current detector, dividing a value for the primary current detected with said current detector to a current detection value for torque and a current detection value for excitation, and dividing an instruction value for the primary current to a current instruction value for torque and a current instruction value for excitation for controlling the motor; comprising the steps of changing an apportion between the current detection value for torque and the current detection value for excitation obtained from said primary current detection value and changing the rated torque characteristics of the motor according to change of the apportion.

2. A method of controlling vectors in a motor according to claim 1; wherein apportion between the current detection value for torque and current detection value for excitation is changed by discretely setting a gain for the current detection value for torque and the current detection value for excitation.

3. A method of controlling vectors in a motor by detecting a primary current in the motor driven by an inverter circuit with a current detector, dividing a value for the primary current detected with said current detector to a current detection value for torque and a current detection value for excitation, and dividing an instruction value for the primary current to a current instruction value for torque and a current instruction value for excitation for controlling the motor; comprising the steps of changing apportion between the current detection value for torque and the current detection value for excitation obtained from said primary current detection value according to an external input signal and switching the rated torque characteristics of the motor according to change of the apportion.

4. A method of controlling vectors in a motor according to claim 3; wherein said external input signal discriminates a short time torque mode in which desired characteristics are obtained for a short time rated torque from a continuous torque mode in which desired characteristics for a continuous rated torque are obtained and the apportion between the current detection value for torque and the current detection value for excitation obtained from said primary current detection value is switched between the short time torque mode and the continuous torque mode.

5. A method of controlling vectors in a motor according to claim 3; wherein the apportion between the current detection value for torque and the current detection value for excitation is changed by discretely setting a gain for the current detection value for torque and the current detection value for excitation.

6. A method of controlling vectors in a motor according to claim 3; wherein a PWM frequency for a pulse width modulating circuit for controlling an inverter is switched according to switching of the rated torque characteristics of the motor by means of changing the apportion between the current detection value for torque and the current detection value for excitation obtained from the primary current detection value.

7. A method of controlling vectors in a motor according to claim 6; wherein in a short time mode, the PWM frequency is set to a frequency which is lower than the frequency of the PWM frequency of an ordinary mode and wherein in a continuous torque mode, the PWM frequency is set to a frequency which is equal to the PWM frequency of the ordinary mode.

8. A method of controlling a vector in a motor by detecting a primary current in the motor driven by an inverter circuit with a current detector, dividing a value for the primary current detected with said current detector to a current detection value for torque and a current detection value for excitation, and dividing an instruction value for the primary current to a current instruction value for torque and a current instruction value for excitation for controlling the motor; comprising the steps of detecting a converter voltage, changing apportion between the current detection value for torque and the current detection value for excitation obtained from said primary current detection value according to the converter voltage detection value, and switching the rated torque characteristics for the motor according to the change of apportion.

9. A method of controlling vectors in a motor according to claim 8; wherein a continuous torque mode in which desired characteristics for a continuous rated torque are obtained is automatically selected in a case where said converter voltage is low, a short time torque mode in which desired characteristics for a short time rated torque are obtained is automatically selected in a case where said converter voltage is high, and apportion between the current detection value for torque and the current detection value for excitation obtained from said primary current detection value is switched between the short time torque mode and the continuous torque mode.

10. A method of controlling vectors in a motor according to claim 8; wherein the apportion between the current detection value for torque and the current detection value for excitation is changed by discretely setting a gain for the current detection value for torque and the current detection value for excitation.

11. A method of controlling vectors in a motor according to claim 8; wherein a PWM frequency for a pulse width modulating circuit for controlling an inverter is switched according to switching of the rated torque characteristics of the motor by means of changing apportion between the current detection value for torque and the current detection value for excitation obtained from the primary current detection value.

12. A method of controlling vectors in a motor according to claim 11; wherein in a short time mode, the PWM frequency is set to a frequency which is lower than the frequency of the PWM frequency of an ordinary mode and wherein in a continuous torque mode, the PWM frequency is set to a frequency which is equal to the PWM frequency of the ordinary mode.

13. A method of controlling a vector in a motor by detecting a primary current in the motor driven by an inverter circuit with a current detector, dividing a value for the primary current detected with said current detector to a current detection value for torque and a current detection value for excitation, and dividing an instruction value for the primary current to a current instruction value for torque and a current instruction value for excitation for controlling the motor; comprising the steps of making a determination as to whether the motor is in powering mode or in regeneration mode, changing apportion between the current detection value for torque and the current detection value for excitation obtained from said primary current detection value according to whether the motor is in powering mode or in regeneration mode, and switching the rated torque characteristics for the motor according to the change of the apportion.

14. A method of controlling vectors in a motor according to claim 13; wherein it is determined that the motor is in regeneration mode if a product of multiplication between a speed detection value for the motor and the current detection value for torque is negative and that the motor is in powering mode if the product is positive.

15. A method of controlling vectors in a motor according to claim 13; wherein a continuous torque mode in which desired characteristics for a continuous rated torque are obtained is automatically selected in a case of the powering mode, a short time torque mode in which desired characteristics for a short time rated torque are obtained is automatically selected in a case of the regeneration mode, and apportion between the current detection value for torque and the current detection value for excitation obtained from said primary current detection value is switched between the short time torque mode and the continuous torque mode.

16. A method of controlling vectors in a motor according to claim 13; wherein apportion between the current detection value for torque and the current detection value for excitation is changed by discretely setting a gain for the current detection value for torque and the current detection value for excitation.

17. A method of controlling vectors in a motor according to claim 13; wherein a PWM frequency for a pulse width modulating circuit for controlling an inverter is switched according to switching of the rated torque characteristics of the motor by means of changing apportion between the current detection value for torque and the current detection value for excitation obtained from the primary current detection value.

18. A method of controlling vectors in a motor according to claim 17; wherein in a short time mode, the PWM frequency is set to a frequency which is lower than the frequency of the PWM frequency of an ordinary mode and wherein in a continuous torque mode, the PWM frequency is set to a frequency which is equal to the PWM frequency of the ordinary mode.

19. A method of controlling a vector in a motor by detecting a primary current in the motor driven by an inverter circuit with a current detector, dividing a value for the primary current detected with said current detector to a current detection value for torque and a current detection value for excitation, and dividing an instruction value for the primary current to a current instruction value for torque and a current instruction value for excitation for controlling the motor; comprising the steps of making a determination as to whether or not the inverter circuit is accelerated/decelerated, changing apportion between the current detection value for torque and the current detection value for excitation obtained from said primary current detection value according to whether or not the inverter circuit is accelerated/decelerated and switching the rated torque characteristics of the motor according to the change of apportion.

20. A method of controlling vectors in a motor according to claim 19; wherein it is determined that the inverter circuit is accelerated/decelerated in a case where an absolute value of deviation between an speed instruction value and a speed detection value is not less than a specified value and that the inverter circuit is not accelerated/decelerated in a case where an absolute value of deviation between the speed instruction value and the speed detection value is less than the specific value.

21. A method of controlling vectors in a motor according to claim 19; wherein a continuous torque mode in which desired characteristics for a continuous rated torque are obtained is automatically selected in a case where the inverter circuit is not accelerated/decelerated, a short time torque mode in which desired characteristics for a short time rated torque are obtained is automatically selected in a case where the inverter circuit is accelerated/decelerated, and apportion between the current detection value for torque and the current detection value for excitation obtained from said primary current detection value is switched between the short time torque mode and the continuous torque mode.

22. A method of controlling vectors in a motor according to claim 19; wherein apportion between the current detection value for torque and the current detection value for excitation is changed by discretely setting a gain for the current detection value for torque and the current detection value for excitation.

23. A method of controlling vectors in a motor according to claim 19; wherein a PWM frequency for a pulse width modulating circuit for controlling an inverter is switched according to switching of the rated torque characteristics of the motor by means of changing apportion between the current detection value for torque and the current detection value for excitation obtained from the primary current detection value.

24. A method of controlling vectors in a motor according to claim 23; wherein in a short time mode, the PWM frequency is set to a frequency which is lower than the frequency of the PWM frequency of an ordinary mode and wherein in a continuous torque mode, the PWM frequency is set to a frequency which is equal to the PWM frequency of the ordinary mode.

25. A vector-controlling inverter device in a motor by detecting a primary current in the motor driven by an inverter circuit with a current detector, dividing a value for the primary current detected with said current detector to a current detection value for torque and a current detection value for excitation, and dividing an instruction value for the primary current to a current instruction value for torque and a current detection value for excitation for controlling the motor; wherein said inverter device has a means for changing apportion between the current detection value for torque and the current detection value for excitation obtained from said primary current detection value and changes the rated torque characteristics for the motor according to change of the apportion.

26. A vector-controlling inverter device in a motor according to claim 25; wherein said means for changing the apportion between the current detection value for torque and the current detection value for excitation obtained from said primary current detection value are gain circuits discretely provided for the current detection value for torque and for the current detection value for excitation.

27. A vector-controlling inverter device in a motor by detecting a primary current in the motor driven by an inverter circuit with a current detector, dividing a value for the primary current detected with said current detector to a current detection value for torque and a current detection value for excitation, and dividing an instruction value for the primary current to a current instruction value for torque and a current detection value for excitation for controlling the motor; wherein said inverter device has a means for changing apportion between the current detection value for torque and the current detection value for excitation obtained from said primary current detection value according to an external input signal and switches the rated torque characteristics for the motor according to change of the apportion.

28. A vector-controlling inverter device in a motor according to claim 27; wherein said external input signal discriminates a short time torque mode in which desired characteristics for a short time rated torque are obtained from a continuous torque mode in which desired characteristics for a continuous rated torque are obtained and apportion between the current detection value for torque and the current detection value for excitation obtained from said primary current detection value is switched between the short time torque mode and the continuous torque mode.

29. A vector-controlling inverter device in a motor according to claim 27; wherein said means for changing the apportion between the current detection value for torque and the current detection value for excitation obtained from said primary current detection value are gain circuits discretely provided for the current detection value for torque and for the current detection value for excitation.

30. A vector-controlling inverter device in a motor according to claim 27 comprising a PWM frequency switching instruction circuit for switching and setting a PWM frequency for a pulse width modulating circuit for inverter control according to switching of the rated torque characteristics of the motor by changing the apportion between the current detection value for torque and the current detection value for excitation obtained from the primary current detection value.

31. A vector-controlling inverter device in a motor according to claim 30; wherein, in a short time torque mode, said PWM frequency switching instruction circuit sets the PWM frequency to a frequency which is lower than the PWM frequency in an ordinary mode, and wherein, in a continuous torque mode, said PWM frequency switching instruction circuit sets the PWM frequency to a frequency which is equal to the PWM frequency in the ordinary mode.

32. A vector-controlling inverter device in a motor which operates by detecting a primary current in the motor driven by an inverter circuit with a current detector, dividing a value for the primary current detected with said current detector to a current detection value for torque and a current detection value for excitation, and dividing an instruction value for the primary current to a current instruction value for torque and a current detection value for excitation for controlling the motor; wherein said inverter device comprises a converter voltage comparator for determining whether or not the converter voltage is less than a specified value and a means for changing apportion between the current detection value for torque and the current detection value for excitation obtained from said primary current detection value according to an output signal from the converter voltage comparator and switches the rated torque characteristics for the motor according to change of the apportion.

33. A vector-controlling inverter device in a motor according to claim 32; wherein, according to a result of comparison with said converter voltage comparator, a continuous torque mode in which desired characteristics for continuous rated torque are obtained is automatically selected in a case where the converter voltage is lower than said specified value, a short time torque mode in which desired characteristics for short time rated torque are obtained is automatically selected in a case where the converter voltage is higher than said specified value, and apportion between the current detection value for torque and the current detection value for excitation obtained from said primary current detection value is switched between the short time torque mode and the continuous torque mode.

34. A vector-controlling inverter device in a motor according to claim 32; wherein said means for changing the apportion between the current detection value for torque and the current detection value for excitation obtained from said primary current detection value are gain circuits discretely provided for the current detection value for torque and for the current detection value for excitation.

35. A vector-controlling inverter device in a motor according to claim 32 comprising a PWM frequency switching instruction circuit for switching and setting a PWM frequency for a pulse width modulating circuit for inverter control according to switching of the rated torque characteristics of the motor by changing the apportion between the current detection value for torque and the current detection value for excitation obtained from the primary current detection value.

36. A vector-controlling inverter device in a motor according to claim 35; wherein, in a short time torque mode, said PWM frequency switching instruction circuit sets the PWM frequency to a frequency which is lower than the PWM frequency in an ordinary mode, and wherein, in a continuous torque mode, said PWM frequency switching instruction circuit sets the PWM frequency to a frequency which is equal to the PWM frequency in the ordinary mode.

37. A vector-controlling inverter device in a motor by detecting a primary current in the motor driven by an inverter circuit with a current detector, dividing a value for the primary current detected with said current detector to a current detection value for torque and a current detection value for excitation, and dividing an instruction value for the primary current to a current instruction value for torque and a current detection value for excitation for controlling the motor; wherein said inverter device comprises a powering/regeneration mode determining circuit for determining whether the motor is in powering mode or in regeneration mode and a means for changing apportion between the current detection value for torque and the current detection value for excitation obtained from said primary current detection value according to a result of determination by said powering/regeneration mode determining circuit and switches the rated torque characteristics for the motor according to change of the apportion.

38. A vector-controlling inverter device in a motor according to claim 37; wherein said powering/regeneration mode determining circuit multiplies a speed detection value for the motor by the current detection value for torque and determines that the motor is in the regeneration mode if the product is negative and that the motor is in the powering mode if the product is positive.

39. A vector-controlling inverter device in a motor according to claim 37; wherein a continuous torque mode in which desired characteristics for a continuous rated torque obtained is automatically selected in a case where it is determined by said powering/regeneration mode determining circuit that the mode is in the powering mode, a short time torque mode in which desired characteristics for a short time rated torque are obtained is automatically selected in a case where it is determined by said powering/regeneration mode determining circuit that the mode is in the regeneration mode, and apportion between the current detection value for torque and the current detection value for excitation obtained from said primary current detection value is switched between the short time torque mode and the continuous torque mode.

40. A vector-controlling inverter device in a motor according to claim 37; wherein said means for changing the apportion between the current detection value for torque and the current detection value for excitation obtained from said primary current detection value are gain circuits discretely provided for the current detection value for torque and for the current detection value for excitation.

41. A vector-controlling inverter device in a motor according to claim 37, further comprising a PWM frequency switching instruction circuit for switching and setting a PWM frequency for a pulse width modulating circuit for inverter control according to switching of the rated torque characteristics of the motor by changing the apportion between the current detection value for torque and the current detection value for excitation obtained from the primary current detection value.

42. A vector-controlling inverter device in a motor according to claim 41; wherein, in a short time torque mode, said PWM frequency switching instruction circuit sets the PWM frequency to a frequency which is lower than the PWM frequency in an ordinary mode, and wherein, in a continuous torque mode, said PWM frequency switching instruction circuit sets the PWM frequency to a frequency which is equal to the PWM frequency in the ordinary mode.

43. A vector-controlling inverter device in a motor which operates by detecting a primary current in the motor driven by an inverter circuit with a current detector, dividing a value for the primary current detected with said current detector to a current detection value for torque and a current detection value for excitation, and dividing an instruction value for the primary current to a current instruction value for torque and a current instruction value for excitation for controlling the motor; wherein said inverter device comprises an acceleration/deceleration determining circuit for determining whether or not the inverter circuit is in acceleration/deceleration and a means for changing the apportion between the current detection value for torque and the current detection value for excitation obtained from said primary current detection value according to a result of determination by said acceleration/deceleration determining circuit and switches the rated torque characteristics for the motor according to change of the apportion.

44. A vector-controlling inverter device in a motor according to claim 43; wherein said acceleration/deceleration determining circuit determines that the inverter circuit is in acceleration/deceleration in a case where an absolute value of deviation between a speed instruction value and a speed detection value is not less than a specified value and that the inverter circuit is not in acceleration/deceleration in a case where an absolute value of deviation between the speed instruction value and the speed detection value is less than the specified value.

45. A vector-controlling inverter device in a motor according to claim 43; wherein a continuous torque mode in which desired characteristics for continuous rated torque are obtained is automatically selected in a case where it is determined by said acceleration/deceleration determining circuit that the inverter circuit is not accelerated/decelerated, a short time torque mode in which desired characteristics for short time rated torque are obtained is automatically selected in a case where it is determined by said acceleration/deceleration determining circuit that the inverter circuit is accelerated/decelerated, and the apportion between the current detection value for torque and the current detection value for excitation obtained from said primary current detection value is switched between the short time torque mode and the continuous torque mode.

46. A vector-controlling inverter device in a motor according to claim 43; wherein said means for changing the apportion between the current detection value for torque and the current detection value for excitation obtained from said primary current detection value are gain circuits discretely provided for the current detection value for torque and for the current detection value for excitation.

47. A vector-controlling inverter device in a motor according to claim 43 comprising a PWM frequency switching instruction circuit for switching and setting a PWM frequency for a pulse width modulating circuit for inverter control according to switching of the rated torque characteristics of the motor by changing the apportion between the current detection value for torque and the current detection value for excitation obtained from the primary current detection value.

48. A vector-controlling inverter device in a motor according to claim 47; wherein, in a short time torque mode, said PWM frequency switching instruction circuit sets the PWM frequency to a frequency which is lower than the PWM frequency in an ordinary mode, and wherein, in a continuous torque mode, said PWM frequency switching instruction circuit sets the PWM frequency to a frequency which is equal to the PWM frequency in the ordinary mode.

* * * * *